United States Patent
Dalbec et al.

(10) Patent No.: US 11,375,276 B2
(45) Date of Patent: Jun. 28, 2022

(54) METHODS AND SYSTEMS FOR RECOMMENDING MEDIA ASSETS BASED ON THE GEOGRAPHIC LOCATION AT WHICH THE MEDIA ASSETS ARE FREQUENTLY CONSUMED

(71) Applicant: Rovi Guides, Inc., San Jose, CA (US)

(72) Inventors: Gabriel C. Dalbec, Morgan Hill, CA (US); Jonathan A. Logan, Mountain View, CA (US); Ajay Kumar Gupta, Andover, MA (US); Alexander W. Liston, Menlo Park, CA (US); William L. Thomas, Evergreen, CO (US); Margret B. Schmidt, Redwood City, CA (US); Mathew C. Burns, Dublin, CA (US)

(73) Assignee: Rovi Guides, Inc., San Jose, CA (US)

( * ) Notice: Subject to any disclaimer, the term of this patent is extended or adjusted under 35 U.S.C. 154(b) by 19 days.

(21) Appl. No.: 17/117,561

(22) Filed: Dec. 10, 2020

(65) Prior Publication Data
US 2021/0144439 A1    May 13, 2021

Related U.S. Application Data

(63) Continuation of application No. 16/775,490, filed on Jan. 29, 2020, now Pat. No. 10,893,327, which is a
(Continued)

(51) Int. Cl.
*H04N 21/45* (2011.01)
*H04N 21/25* (2011.01)
(Continued)

(52) U.S. Cl.
CPC ......... *H04N 21/4524* (2013.01); *G06F 16/29* (2019.01); *G06F 16/487* (2019.01);
(Continued)

(58) Field of Classification Search
CPC ............. H04N 21/4524; H04N 21/251; H04N 21/25841; H04N 21/466; H04N 21/4668;
(Continued)

(56) References Cited

U.S. PATENT DOCUMENTS

| 4,107,735 A | 8/1978 | Frohback |
| 4,329,684 A | 5/1982 | Monteath et al. |

(Continued)

FOREIGN PATENT DOCUMENTS

| AR | 032857 B2 | 5/2008 |
| CA | 2285645 | 7/1998 |

(Continued)

OTHER PUBLICATIONS

Cue Readers, Digital: Convergence Corporation, at http://www.crq.com/mastertempl.cfm?view=products&products=cuereader (printed Sep. 24, 2001) (2 pgs).

(Continued)

*Primary Examiner* — Robert J Hance
(74) *Attorney, Agent, or Firm* — Haley Guiliano LLP

(57) ABSTRACT

Methods and systems are provided herein for recommending a media asset based on a geographic location at which that media asset was frequently consumed. For example, the system may monitor a location, such as New York City or Times Square, to determine popular media assets watched there, such as "The Avengers," and when another user visits New York City, the system may then notify the user that the movie, such as "The Avengers," is associated with New York City. The system stores the geographic locations associated with the media asset in the database based on the consumption of the media asset so that other users may be notified which media assets are associated with each geographic location.

20 Claims, 9 Drawing Sheets

Related U.S. Application Data continuation of application No. 16/100,378, filed on Aug. 10, 2018, now Pat. No. 10,587,917, which is a continuation of application No. 15/474,247, filed on Mar. 30, 2017, now Pat. No. 10,091,549.

(51) Int. Cl.

| | |
|---|---|
| H04N 21/466 | (2011.01) |
| H04L 67/52 | (2022.01) |
| H04N 21/482 | (2011.01) |
| H04N 21/258 | (2011.01) |
| G06F 16/29 | (2019.01) |
| G06F 16/487 | (2019.01) |
| G06Q 30/02 | (2012.01) |
| G06F 16/9537 | (2019.01) |
| G06Q 30/06 | (2012.01) |

(52) U.S. Cl.
CPC ..... *G06F 16/9537* (2019.01); *G06Q 30/0241* (2013.01); *G06Q 30/0261* (2013.01); *G06Q 30/0264* (2013.01); *G06Q 30/0269* (2013.01); *G06Q 30/0631* (2013.01); *H04L 67/18* (2013.01); *H04N 21/251* (2013.01); *H04N 21/25841* (2013.01); *H04N 21/466* (2013.01); *H04N 21/4668* (2013.01); *H04N 21/4826* (2013.01); *H04N 21/252* (2013.01); *H04N 21/4821* (2013.01)

(58) Field of Classification Search
CPC ............. H04N 21/4826; H04N 21/252; H04N 21/4821; G06F 16/29; G06F 16/487; G06F 16/9537; G06Q 30/0241; G06Q 30/0261; G06Q 30/0264; G06Q 30/0269; G06Q 30/0631; H04L 67/18
See application file for complete search history.

(56) References Cited

U.S. PATENT DOCUMENTS

| | | | |
|---|---|---|---|
| 4,331,974 | A | 5/1982 | Cogswell et al. |
| 4,488,179 | A | 12/1984 | Kruger |
| 4,536,791 | A | 8/1985 | Campbell et al. |
| 4,694,490 | A | 9/1987 | Harvey et al. |
| 4,866,258 | A | 9/1989 | Ueda et al. |
| 4,977,455 | A | 12/1990 | Young |
| 4,996,642 | A | 2/1991 | Hey |
| 5,099,319 | A | 3/1992 | Esch et al. |
| 5,151,789 | A | 9/1992 | Young |
| 5,155,591 | A | 10/1992 | Wachob |
| 5,212,553 | A | 5/1993 | Maruoka |
| 5,223,924 | A | 6/1993 | Strubbe |
| 5,227,874 | A | 7/1993 | Von Kohorn |
| 5,253,066 | A | 10/1993 | Vogel |
| 5,335,277 | A | 8/1994 | Harvey et al. |
| 5,351,075 | A | 9/1994 | Herz et al. |
| 5,353,121 | A | 10/1994 | Young et al. |
| 5,357,276 | A | 10/1994 | Banker et al. |
| 5,374,951 | A | 12/1994 | Welsh |
| 5,382,970 | A | 1/1995 | Kiefl |
| 5,410,344 | A | 4/1995 | Graves et al. |
| 5,446,919 | A | 8/1995 | Wilkins |
| 5,452,012 | A | 9/1995 | Saitoh |
| 5,468,948 | A | 11/1995 | Koenck et al. |
| 5,483,278 | A | 1/1996 | Strubbe et al. |
| 5,485,197 | A | 1/1996 | Hoarty |
| 5,488,409 | A | 1/1996 | Yuen et al. |
| 5,502,504 | A | 3/1996 | Marshall et al. |
| 5,515,098 | A | 5/1996 | Caries |
| 5,526,257 | A | 6/1996 | Lerner |
| 5,534,911 | A | 7/1996 | Levitan |
| 5,539,822 | A | 7/1996 | Lett |
| 5,548,345 | A | 8/1996 | Brian |
| 5,557,721 | A | 9/1996 | Fite et al. |
| 5,559,548 | A | 9/1996 | Davis et al. |
| 5,559,549 | A | 9/1996 | Hendricks et al. |
| 5,559,550 | A | 9/1996 | Mankovitz |
| 5,572,442 | A | 11/1996 | Schulhof et al. |
| 5,574,962 | A | 11/1996 | Fardeau et al. |
| 5,583,560 | A | 12/1996 | Florin et al. |
| 5,585,838 | A | 12/1996 | Lawler et al. |
| 5,585,866 | A | 12/1996 | Miller et al. |
| 5,589,892 | A | 12/1996 | Knee et al. |
| 5,592,551 | A | 1/1997 | Lett et al. |
| 5,594,509 | A | 1/1997 | Florin et al. |
| 5,600,364 | A | 2/1997 | Hendricks et al. |
| 5,600,365 | A | 2/1997 | Kondo et al. |
| 5,600,573 | A | 2/1997 | Hendricks et al. |
| 5,608,448 | A | 3/1997 | Smoral et al. |
| 5,610,653 | A | 3/1997 | Abecassis |
| 5,621,456 | A | 4/1997 | Florin et al. |
| 5,623,613 | A | 4/1997 | Rowe et al. |
| 5,629,733 | A | 5/1997 | Youman et al. |
| 5,635,978 | A | 6/1997 | Alten et al. |
| 5,635,979 | A | 6/1997 | Kostreski et al. |
| 5,636,346 | A | 6/1997 | Saxe |
| 5,640,002 | A | 6/1997 | Ruppert et al. |
| 5,657,072 | A | 8/1997 | Aristedes et al. |
| 5,657,091 | A | 8/1997 | Bertram |
| 5,659,350 | A | 8/1997 | Hendricks et al. |
| 5,663,757 | A | 9/1997 | Morales |
| 5,666,293 | A | 9/1997 | Metz |
| 5,666,645 | A | 9/1997 | Thomas et al. |
| 5,677,708 | A | 10/1997 | Matthews, III et al. |
| 5,682,195 | A | 10/1997 | Hendricks et al. |
| 5,686,954 | A | 11/1997 | Yoshinobu et al. |
| 5,687,331 | A | 11/1997 | Volk et al. |
| 5,724,521 | A | 3/1998 | Dedrick |
| 5,734,853 | A | 3/1998 | Hendricks et al. |
| 5,740,549 | A | 4/1998 | Reilly et al. |
| 5,749,043 | A | 5/1998 | Worthy |
| 5,754,939 | A | 5/1998 | Herz et al. |
| 5,758,257 | A | 5/1998 | Herz et al. |
| 5,760,821 | A | 6/1998 | Ellis et al. |
| 5,774,170 | A | 6/1998 | Hite et al. |
| 5,781,246 | A | 7/1998 | Alten et al. |
| 5,790,426 | A | 8/1998 | Robinson |
| 5,790,835 | A | 8/1998 | Case et al. |
| 5,790,935 | A | 8/1998 | Payton |
| 5,793,409 | A | 8/1998 | Tetsumura |
| 5,796,952 | A | 8/1998 | Davis et al. |
| 5,798,785 | A | 8/1998 | Hendricks et al. |
| 5,801,747 | A | 9/1998 | Bedard |
| 5,801,785 | A | 9/1998 | Crump et al. |
| 5,805,154 | A | 9/1998 | Brown |
| 5,808,694 | A | 9/1998 | Usui et al. |
| 5,819,156 | A | 10/1998 | Belmont |
| 5,822,123 | A | 10/1998 | Davis et al. |
| 5,828,420 | A | 10/1998 | Marshall et al. |
| 5,828,839 | A | 10/1998 | Moncreiff |
| 5,830,068 | A | 11/1998 | Brenner et al. |
| 5,838,314 | A | 11/1998 | Neel et al. |
| 5,842,010 | A | 11/1998 | Jain et al. |
| 5,842,199 | A | 11/1998 | Miller et al. |
| 5,844,620 | A | 12/1998 | Coleman et al. |
| 5,848,396 | A | 12/1998 | Gerace |
| 5,850,218 | A | 12/1998 | Lajoie et al. |
| 5,867,226 | A | 2/1999 | Wehmeyer et al. |
| 5,870,543 | A | 2/1999 | Ronning |
| 5,872,588 | A | 2/1999 | Aras et al. |
| 5,880,768 | A | 3/1999 | Lemmons et al. |
| 5,886,691 | A | 3/1999 | Furuya et al. |
| 5,886,731 | A | 3/1999 | Ebisawa |
| 5,900,905 | A | 5/1999 | Shoff et al. |
| 5,907,323 | A | 5/1999 | Lawler et al. |
| 5,918,014 | A | 6/1999 | Robinson |
| 5,920,700 | A | 7/1999 | Gordon et al. |
| 5,939,695 | A | 8/1999 | Nelson |
| 5,940,073 | A | 8/1999 | Klosterman et al. |
| 5,945,988 | A | 8/1999 | Williams et al. |
| 5,951,642 | A | 9/1999 | Onoe et al. |
| 5,953,005 | A | 9/1999 | Liu |

(56) References Cited

U.S. PATENT DOCUMENTS

| | | |
|---|---|---|
| 5,956,716 A | 9/1999 | Kenner et al. |
| 5,969,748 A | 10/1999 | Casement et al. |
| 5,974,222 A | 10/1999 | Yuen et al. |
| 5,977,964 A | 11/1999 | Williams et al. |
| 5,990,927 A | 11/1999 | Hendricks et al. |
| 5,991,735 A | 11/1999 | Gerace |
| 5,999,698 A | 12/1999 | Nakai et al. |
| 6,002,393 A | 12/1999 | Hite et al. |
| 6,002,394 A | 12/1999 | Schein et al. |
| 6,005,597 A | 12/1999 | Barrett et al. |
| 6,006,257 A | 12/1999 | Slezak |
| 6,008,836 A | 12/1999 | Bruck |
| 6,014,502 A | 1/2000 | Moraes |
| 6,018,372 A | 1/2000 | Etheredge |
| 6,020,929 A | 2/2000 | Marshall et al. |
| 6,025,837 A | 2/2000 | Matthews, III et al. |
| 6,025,886 A | 2/2000 | Koda |
| 6,029,045 A | 2/2000 | Picco et al. |
| 6,029,176 A | 2/2000 | Cannon |
| 6,029,195 A | 2/2000 | Herz |
| 6,041,311 A * | 3/2000 | Chislenko ........ G06Q 30/0631 |
| | | 705/26.7 |
| 6,047,317 A | 4/2000 | Bbisdkian et al. |
| 6,052,145 A | 4/2000 | Macrae et al. |
| 6,061,082 A | 5/2000 | Park |
| 6,061,097 A | 5/2000 | Satterfield |
| 6,064,376 A | 5/2000 | Berezowski et al. |
| 6,064,980 A | 5/2000 | Jacobi et al. |
| 6,078,348 A | 6/2000 | Klosterman et al. |
| 6,081,830 A | 6/2000 | Schindler |
| 6,097,441 A | 8/2000 | Allport |
| 6,111,614 A | 8/2000 | Mugura et al. |
| 6,112,186 A | 8/2000 | Bergh et al. |
| 6,115,057 A | 9/2000 | Kwoh et al. |
| 6,118,492 A | 9/2000 | Milnes et al. |
| 6,119,098 A | 9/2000 | Guyot et al. |
| 6,119,101 A | 9/2000 | Peckover |
| 6,122,011 A | 9/2000 | Dias |
| 6,133,909 A | 10/2000 | Schein et al. |
| 6,137,950 A | 10/2000 | Yuen |
| 6,144,702 A | 11/2000 | Yurt et al. |
| 6,151,059 A | 11/2000 | Schein et al. |
| 6,157,413 A | 12/2000 | Hanafee et al. |
| 6,160,570 A | 12/2000 | Sitnik |
| 6,163,316 A | 12/2000 | Killian |
| 6,172,677 B1 | 1/2001 | Stautner et al. |
| 6,177,931 B1 | 1/2001 | Alexander et al. |
| 6,178,446 B1 | 1/2001 | Gerszberg et al. |
| 6,181,335 B1 | 1/2001 | Hendricks et al. |
| 6,186,287 B1 | 2/2001 | Heidenreich et al. |
| 6,201,536 B1 | 3/2001 | Hendricks et al. |
| 6,202,062 B1 | 3/2001 | Cameron et al. |
| 6,239,794 B1 | 5/2001 | Yuen et al. |
| 6,240,555 B1 | 5/2001 | Shoff et al. |
| 6,256,785 B1 | 7/2001 | Klappert et al. |
| 6,262,721 B1 | 7/2001 | Tsukidate et al. |
| 6,263,501 B1 | 7/2001 | Schein et al. |
| 6,263,507 B1 | 7/2001 | Ahmad et al. |
| 6,279,157 B1 | 8/2001 | Takasu |
| 6,286,005 B1 | 9/2001 | Cannon |
| 6,286,140 B1 | 9/2001 | Ivanyi |
| 6,298,482 B1 | 10/2001 | Seidman et al. |
| 6,312,336 B1 | 11/2001 | Handelman et al. |
| 6,317,881 B1 | 11/2001 | Shah-Nazaroff et al. |
| 6,321,991 B1 | 11/2001 | Knowles |
| 6,323,911 B1 | 11/2001 | Schein et al. |
| 6,330,586 B1 | 12/2001 | Yates et al. |
| 6,331,877 B1 | 12/2001 | Bennington et al. |
| 6,343,311 B1 | 1/2002 | Nishida et al. |
| 6,353,929 B1 | 3/2002 | Houston |
| 6,359,661 B1 | 3/2002 | Nickum |
| 6,363,525 B1 | 3/2002 | Dougherty et al. |
| 6,366,890 B1 | 4/2002 | Usrey |
| 6,388,714 B1 | 5/2002 | Schein et al. |
| 6,389,593 B1 | 5/2002 | Yamagishi |
| 6,392,710 B1 | 5/2002 | Gonsalves et al. |
| 6,405,370 B1 | 6/2002 | Jarrell |
| 6,405,926 B1 | 6/2002 | Yomogida et al. |
| 6,408,437 B1 | 6/2002 | Hendricks et al. |
| 6,412,110 B1 | 6/2002 | Schein et al. |
| 6,418,556 B1 | 7/2002 | Bennington et al. |
| 6,445,306 B1 | 9/2002 | Trovato et al. |
| 6,453,471 B1 | 9/2002 | Klosterman |
| 6,463,585 B1 | 10/2002 | Hendricks et al. |
| 6,469,753 B1 | 10/2002 | Klosterman et al. |
| 6,470,497 B1 | 10/2002 | Ellis et al. |
| 6,477,705 B1 | 11/2002 | Yuen et al. |
| 6,502,241 B1 | 12/2002 | Kretz et al. |
| 6,515,680 B1 | 2/2003 | Hendricks et al. |
| 6,516,323 B1 | 2/2003 | Kamba |
| 6,530,082 B1 | 3/2003 | Del Sesto et al. |
| 6,539,548 B1 | 3/2003 | Hendricks et al. |
| 6,564,378 B1 | 5/2003 | Satterfield et al. |
| 6,587,127 B1 | 7/2003 | Leeke |
| 6,622,306 B1 | 9/2003 | Kamada |
| 6,637,029 B1 | 10/2003 | Maissel et al. |
| 6,698,020 B1 | 2/2004 | Zigmond et al. |
| 6,704,931 B1 | 3/2004 | Schaffer et al. |
| 6,738,978 B1 | 5/2004 | Hendricks et al. |
| 6,750,881 B1 | 6/2004 | Appelman |
| 6,750,885 B1 | 6/2004 | Finch et al. |
| 6,757,691 B1 | 6/2004 | Welsh et al. |
| 6,766,956 B1 | 7/2004 | Boylan, III et al. |
| 6,792,618 B1 | 9/2004 | Bendinelli et al. |
| 6,983,478 B1 | 1/2006 | Grauch et al. |
| 6,999,698 B2 | 2/2006 | Yamauchi |
| 7,003,792 B1 | 2/2006 | Yuen |
| 7,047,550 B1 | 5/2006 | Yasukawa et al. |
| 7,117,518 B1 | 10/2006 | Takahashi et al. |
| 7,165,098 B1 | 1/2007 | Boyer et al. |
| 7,188,356 B1 | 3/2007 | Miura et al. |
| 7,200,852 B1 | 4/2007 | Block |
| 7,343,614 B1 | 3/2008 | Hendricks et al. |
| 7,356,547 B2 | 4/2008 | Ozer et al. |
| 7,478,414 B1 | 1/2009 | Glusker et al. |
| 7,623,823 B2 | 11/2009 | Zito et al. |
| 7,761,098 B1 | 7/2010 | Nguyen et al. |
| 7,813,822 B1 | 10/2010 | Hoffberg |
| 8,001,143 B1 | 8/2011 | Gupta et al. |
| 8,046,801 B2 | 10/2011 | Ellis et al. |
| 8,613,024 B2 | 12/2013 | Bovenschulte et al. |
| 9,224,118 B2 * | 12/2015 | Sharifi ................ G06F 16/29 |
| 2001/0021994 A1 | 9/2001 | Nash |
| 2002/0010930 A1 | 1/2002 | Shah-Nazaroff et al. |
| 2002/0056087 A1 | 5/2002 | Berezowski et al. |
| 2002/0059602 A1 | 5/2002 | Macrae et al. |
| 2002/0095676 A1 | 7/2002 | Knee et al. |
| 2002/0100040 A1 * | 7/2002 | Bull ................ G07F 17/32 |
| | | 725/24 |
| 2002/0112239 A1 | 8/2002 | Goldman |
| 2002/0174430 A1 | 11/2002 | Ellis et al. |
| 2003/0010454 A1 | 1/2003 | Bailley, III et al. |
| 2003/0110171 A1 | 6/2003 | Ozer et al. |
| 2003/0131355 A1 | 7/2003 | Berenson et al. |
| 2003/0146940 A1 | 8/2003 | Ellis et al. |
| 2004/0003397 A1 | 1/2004 | Boston et al. |
| 2004/0022278 A1 | 2/2004 | Thomas et al. |
| 2004/0049788 A1 | 3/2004 | Mori et al. |
| 2004/0194138 A1 | 9/2004 | Boylan, III et al. |
| 2004/0243470 A1 | 12/2004 | Ozer et al. |
| 2005/0020439 A1 | 1/2005 | Ishii et al. |
| 2005/0204379 A1 | 3/2005 | Yamamori |
| 2005/0076363 A1 | 4/2005 | Dukes |
| 2005/0235318 A1 | 6/2005 | Grauch et al. |
| 2005/0149964 A1 | 7/2005 | Thomas et al. |
| 2005/0251824 A1 | 11/2005 | Thomas et al. |
| 2005/0251827 A1 | 11/2005 | Ellis et al. |
| 2005/0278741 A1 | 12/2005 | Robarts et al. |
| 2006/0031916 A1 | 2/2006 | Colter et al. |
| 2006/0174277 A1 | 8/2006 | Sezan et al. |
| 2006/0190966 A1 | 8/2006 | Mckissick et al. |
| 2006/0218587 A1 | 9/2006 | Kelts |
| 2006/0248558 A1 | 11/2006 | Barton et al. |
| 2007/0113244 A1 | 5/2007 | Verschueren |

(56) References Cited

U.S. PATENT DOCUMENTS

| | | | |
|---|---|---|---|
| 2007/0136753 A1 | 6/2007 | Bovenschulte et al. | |
| 2007/0204298 A1* | 8/2007 | Shanks | H04N 21/47 348/565 |
| 2008/0109284 A1 | 5/2008 | Slaney et al. | |
| 2008/0155614 A1* | 6/2008 | Cooper | G06F 21/10 705/26.1 |
| 2008/0196053 A1 | 8/2008 | Thomas et al. | |
| 2008/0276275 A1 | 11/2008 | Ellis | |
| 2009/0248833 A1* | 10/2009 | Frazier | G06F 16/487 709/217 |
| 2009/0292375 A1* | 11/2009 | Thompson | G08C 19/28 700/86 |
| 2010/0050042 A1* | 2/2010 | White | H04L 1/18 714/752 |
| 2010/0122282 A1 | 5/2010 | DuBose | |
| 2010/0153885 A1 | 6/2010 | Yates | |
| 2010/0175081 A1 | 7/2010 | Boylan, III et al. | |
| 2010/0192172 A1 | 7/2010 | Thomas et al. | |
| 2011/0078628 A1 | 3/2011 | Rosenberg et al. | |
| 2011/0082861 A1* | 4/2011 | Gibson | H04N 21/6582 707/803 |
| 2011/0283322 A1* | 11/2011 | Hamano | H04N 21/47 725/44 |
| 2012/0122570 A1 | 5/2012 | Baronoff | |
| 2012/0249741 A1 | 10/2012 | Maciocci et al. | |
| 2012/0254910 A1* | 10/2012 | Donoghue | H04N 21/4825 725/14 |
| 2013/0035086 A1* | 2/2013 | Chardon | H04N 21/4826 455/420 |
| 2013/0111512 A1* | 5/2013 | Scellato | H04L 67/18 725/14 |
| 2013/0117773 A1 | 5/2013 | Davies | |
| 2014/0032698 A1* | 1/2014 | Hsu | H04L 65/105 709/213 |
| 2014/0344861 A1* | 11/2014 | Berner | H04N 21/41407 725/46 |
| 2015/0012593 A1* | 1/2015 | Phillips | H04L 47/20 709/204 |
| 2015/0121413 A1* | 4/2015 | Ramakrishnan | G06F 16/9574 725/62 |
| 2015/0134653 A1* | 5/2015 | Bayer | H04N 21/4314 707/732 |
| 2021/0204026 A1 | 7/2021 | Dalbec et al. | |

FOREIGN PATENT DOCUMENTS

| | | |
|---|---|---|
| CA | 2454011 | 9/2008 |
| CN | 1494321 A | 5/2004 |
| EP | 0424648 | 5/1991 |
| EP | 0 711 076 | 5/1996 |
| EP | 0753964 | 1/1997 |
| EP | 0772360 | 5/1997 |
| EP | 0784405 | 7/1997 |
| EP | 0822718 | 2/1998 |
| EP | 0849948 | 6/1998 |
| EP | 0851681 | 7/1998 |
| EP | 1060617 | 5/2004 |
| EP | 1217832 | 6/2004 |
| EP | 1961228 | 3/2011 |
| JP | 59141878 | 8/1984 |
| JP | 61050470 | 3/1986 |
| JP | H0479053 | 3/1992 |
| JP | 06-124309 | 5/1994 |
| JP | 723356 | 4/1995 |
| JP | 8331546 | 12/1996 |
| JP | 9261609 | 10/1997 |
| JP | 10-013774 | 1/1998 |
| JP | 10-93933 | 4/1998 |
| JP | 1177782 | 7/1998 |
| JP | 4443042 | 3/2010 |
| JP | 201057201 | 3/2010 |
| WO | WO 1994014284 | 6/1994 |
| WO | WO 19940014281 | 6/1994 |
| WO | WO 1994023383 | 10/1994 |
| WO | WO 1995007003 | 3/1995 |
| WO | WO 1995015658 | 6/1995 |
| WO | WO 1995032585 | 11/1995 |
| WO | WO 1996008109 | 3/1996 |
| WO | WO 1996008113 | 3/1996 |
| WO | WO 1996009721 | 3/1996 |
| WO | WO 1996026605 | 8/1996 |
| WO | WO 1996034491 | 10/1996 |
| WO | WO 1996041471 | 12/1996 |
| WO | WO 1996041478 | 12/1996 |
| WO | WO 1997007656 | 3/1997 |
| WO | WO 1997012486 | 4/1997 |
| WO | WO 1997013368 | 4/1997 |
| WO | WO 1997017774 | 5/1997 |
| WO | WO 1997018675 | 5/1997 |
| WO | WO 1997026612 | 7/1997 |
| WO | WO 1997031480 | 8/1997 |
| WO | WO 1997041673 | 11/1997 |
| WO | WO 1997042763 | 11/1997 |
| WO | WO 1997048230 | 12/1997 |
| WO | WO 1997049237 | 12/1997 |
| WO | WO 1997049242 | 12/1997 |
| WO | WO 1998006219 | 2/1998 |
| WO | WO 1998017064 | 4/1998 |
| WO | WO 1998026584 | 6/1998 |
| WO | WO 1998027723 | 6/1998 |
| WO | WO 1998028906 | 7/1998 |
| WO | WO 1998041020 | 9/1998 |
| WO | WO 1998056172 | 12/1998 |
| WO | WO 1999004561 | 1/1999 |
| WO | WO 1999007142 | 2/1999 |
| WO | WO 1999012346 | 3/1999 |
| WO | WO 1999029109 | 6/1999 |
| WO | WO 1999045700 | 9/1999 |
| WO | WO 1999045702 | 9/1999 |
| WO | WO 1999052285 | 10/1999 |
| WO | WO 1999059275 | 11/1999 |
| WO | WO 1999060789 | 11/1999 |
| WO | WO 1999060790 | 11/1999 |
| WO | WO 1999066725 | 12/1999 |
| WO | WO 1999066726 | 12/1999 |
| WO | WO 2000004706 | 1/2000 |
| WO | WO 2000004709 | 1/2000 |
| WO | WO 2000016548 | 3/2000 |
| WO | WO 2000027122 | 5/2000 |
| WO | WO 2000027124 | 5/2000 |
| WO | WO 2000028734 | 5/2000 |
| WO | WO 2000033160 | 6/2000 |
| WO | WO 2000033224 | 6/2000 |
| WO | WO 2000049801 | 8/2000 |
| WO | WO 2000078050 | 12/2000 |
| WO | WO 2001001308 | 1/2001 |
| WO | WO 2001076248 | 10/2001 |
| WO | WO 2001089213 | 11/2001 |
| WO | WO 2002025938 | 3/2002 |
| WO | WO 2002031731 | 4/2002 |
| WO | WO 2003036970 | 5/2003 |
| WO | WO 2003051051 | 6/2003 |
| WO | WO 2007070422 | 6/2007 |
| WO | WO-2014085610 A1 * | 6/2014 ........ G11B 27/031 |

OTHER PUBLICATIONS

GoCode, The Code Corporate at http://www.gocode.com/products/reader.htm (printed Sep. 24, 2001) (1 pg.).
Grounds, facts and Evidence in Support of Opposition to EP-1961228 (Dec. 11, 2011; 22 pages).
Paperclick, NeoMedia Technologies, Inc., at http://www.paperclick.com/Howworks,htm (printed Sep. 24, 2001) (3 pgs.).
"Television Viewing Habits of Three IQ Groups of Urban Middle School Students", Kunst, University of Pittsburgh, 1986, pp. 2-219 (54 pages).
Video Plus+, Gemstar Development Limited, at http://www.gemstarco.uk/en/videoplus/intro-main.html (printed Sep. 24, 2001) (2 pgs.).

* cited by examiner

METHODS AND SYSTEMS FOR RECOMMENDING MEDIA ASSETS BASED ON THE GEOGRAPHIC LOCATION AT WHICH THE MEDIA ASSETS ARE FREQUENTLY CONSUMED

CROSS-REFERENCE TO RELATED APPLICATIONS

This application is a continuation of U.S. patent application Ser. No. 16/775,490, filed Jan. 29, 2020, which is a continuation of U.S. patent application Ser. No. 16/100,378, filed Aug. 10, 2018, now U.S. Pat. No. 10,587,917, which is a continuation of U.S. patent application Ser. No. 15/474,247, filed Mar. 30, 2017, now U.S. Pat. No. 10,091,549, the disclosure of which are hereby incorporated by reference herein in their entireties.

BACKGROUND

Access to the increasing variety of media assets continues to grow through mobile devices, streaming platforms and more. As the options for media increase, it becomes increasingly more important to appropriately organize, store, and provide access to these media assets in a way that matches users' needs. Various platforms and systems provide ways to recommend media to users based on context, user history, and popularity. However, these systems fail to account for how to tag and distribute media assets based on the location associated with the user and whether the media asset is frequently consumed in that location. Some systems may include a location associated with the media asset using only the location where a user created the media asset. These systems do not sort and distribute media assets based where they are consumed.

SUMMARY

Methods and systems are provided herein for recommending a media asset based on a geographic location at which that media asset was frequently consumed. By tagging each media asset with a location at which it was frequently consumed, the media guidance application provides a way to determine the most appropriate location to consume the media asset, possibly due to the subject matter of the media asset. For example, the system may monitor a location, such as New York City or Times Square, to determine popular media assets watched there, such as "The Avengers," and when another user visits New York City, the system may then notify the user that the movie, such as "The Avengers," is associated with New York City. The system stores the geographic locations associated with the media asset in the database based on the consumption of the media asset so that other users may be notified which media assets are associated with each geographic location.

In some aspects, the media guidance application monitors consumption of the media asset by a plurality of users at a first geographic location. For example, the media guidance application may monitor the consumption of the media asset by tracking the viewing history of users within a set distance of a geographic location, such as all users within three blocks of Times Square. In another example, the media guidance application may monitor what media assets any user at any location consumes, identify when a user selects to consume a specific media asset, such as "The Avengers," identify the location of the user from which the selection was received, such as in New York City, and store, in association with the location, such as New York City or Times Square, an updated number of people that consumed the media asset, such as "The Avengers."

The media guidance application determines a number of users of the plurality of users that consumed the media asset at the first geographic location. In some embodiments, the media guidance application may determine a number of users by counting the number of users in a specified location, such as New York City or Times Square, with a specific media asset, such as "The Avengers," on the respective user's viewing history. In other embodiments, the media guidance application may retrieve from memory an updated number of people that consumed the media asset, such as "The Avengers," where the updated number of people was stored in association with a location, such as New York City or Times Square.

In some embodiments, the media guidance application determines the number of users of the plurality of users that consumed the media asset at the first geographic location by detecting that a user is consuming the media asset at the selected geographic location and incrementing the number of users that consumed the media asset at the selected geographic location in the database by one. For example, the media guidance application may detect that a user is currently consuming a media asset, such as "The Avengers," at a location, such as New York City, and increment by one the number of users that consumed the media asset, such as "The Avengers," at the selected geographic location, such as New York City or Times Square, as it is stored in the database.

In some embodiments, the media guidance application determines the number of users of the plurality of users that consumed the media asset at the first geographic location by determining the number of users that consumed the media asset within a threshold distance from the first geographic location. For example, the media guidance application may determine that anyone within 3 city blocks of the intersection of 45$^{th}$ Street and Broadway is in Times Square. In other embodiments, the media guidance application may have predetermined regions associated with a location. For example, the media guidance application may draw a region including multiple city blocks and anyone within the determined boundaries is at Times Square.

The media guidance application determines whether the number of users that consumed the media asset at the first geographic location exceeds a threshold. In some embodiments, the media guidance application may set the threshold based on the number of users that consumed other media assets at the same location, such as New York City or Times Square. In other embodiments, the media guidance application may set the threshold based on the number of users that have watched the same media asset, such as "The Avengers" in another location, such as New York City or Times Square. In yet other embodiments, the media guidance application may receive from the user a selected setting indicating the threshold. In some embodiments, the threshold may be based on population of the first geographic location. For example, if "The Avengers" is watched an equivalent number of times in New York City and Omaha, the number of users watching "The Avengers" would be a greater proportion of the population of Omaha than of the population of New York City, and so a threshold may be set based on the size of the proportion of the population of a location which consumes the media asset.

The media guidance application stores the first geographic location and the corresponding number of users in an entry corresponding to the media asset in the database. The database may include for any media asset a set of geographic locations and corresponding numbers of users associated with the media asset. For example, the media guidance application may include the location, such as New York City or Times Square, in a set of geographic locations associated with the media asset, such as "The Avengers," stored in the database along with the corresponding number of users for each location.

The media guidance application retrieves, from the entry corresponding to the media asset in the database, a set of stored geographic locations associated with the media asset and the corresponding number of users for each geographic location. In some embodiments, the media guidance application may retrieve from the database the set of geographic locations, such as New York City or Times Square, Washington D.C., and Boston, and the corresponding number of users that consumed the media asset, such as "The Avengers," in each location of the set.

The media guidance application selects, from the set of stored geographic locations associated with the media asset, a geographic location with a highest number of users. In some embodiments, the media guidance application selects, from the set of stored geographic locations associated with the media asset, the geographic location with the highest corresponding number of users, by ranking the set of geographic locations based on the corresponding number of users of each geographic location. For example, the media guidance application may select the geographic location of the set with the highest number of users, such as New York City or Times Square. In some embodiments, the media guidance application ranks the set of stored geographic locations by weighting each geographic location in the set of stored geographic locations using the location metadata (or any portion of related metadata) for the show itself. For example, if "The Avengers"—which takes place in New York City—is consumed by roughly the same number of people in New York City as in Dallas, Boston, and San Francisco, the media guidance application would give a higher overall weighting to New York City as a relevant location for consumption. In some embodiments, the media guidance application ranks the set of stored geographic locations by determining for each location of the set of stored geographic locations the proportion of the population of the location that consumes the media asset and weighting each location accordingly.

The media guidance application designates the selected geographic location as a geographic location at which the media asset was frequently consumed. For example, the media guidance application designates the location, such as New York City or Times Square, as a geographic location at which the media asset, such as "The Avengers," was frequently consumed.

The media guidance application detects a user at the selected geographic location. The media guidance application may track the location of a user through the user's mobile device or other user equipment. In some embodiments, the media guidance application detects the user at the selected geographic location by detecting that the user is within a threshold distance from the selected geographic location. For example, the media guidance application may determine that anyone within three city blocks of the intersection of 45$^{th}$ Street and Broadway is in Times Square. In other embodiments, the media guidance application may have predetermined regions associated with a location. For example, the media guidance application may draw a region including multiple city blocks and anyone within the determined boundaries is at Times Square.

The media guidance application recommends the media asset to the user based on detecting the user at the selected geographic location. The media guidance application may notify the user of the recommended media asset and identify the selected geographic location associated with the recommendation. The notification may include additional information such as broadcast schedules, actor information, or source. The media guidance application may distribute the media asset to the user equipment and start playback, record the media asset, or perform any associated media guidance operations.

In some embodiments, the selected geographic location is the first geographic location, and the first geographic location is a virtual location within a virtual reality map. For example, the media guidance application may provide the user with access to a virtual reality map resembling a location, such as New York City or Times Square, through a virtual reality system. In some embodiments, the virtual reality map comprises a plurality of artificial locations. For example, the media guidance application may provide the user with access to an artificial location, such as Westeros, through the virtual reality system. If the user is accessing virtual locations, such as Times Square or Westeros, the media guidance application may determine the user's location to be Times Square or Westeros based on the virtual locations. In some embodiments, the media guidance application detects a user at the first geographic location by detecting that the user is accessing the virtual location using the virtual reality system. For example, the media guidance application may detect the virtual location, such as Paris, currently accessed by the user.

In some embodiments, the media guidance application monitors consumption of the media asset by the plurality of users at a first geographic location by monitoring the consumption of the media asset by a first plurality of users at the virtual location in the virtual reality system and monitoring the consumption of the media asset by a second plurality of users at a second geographic location associated with virtual location in the virtual reality system, wherein the second geographic location is not a virtual location. For example, the media guidance application may monitor the users accessing the media asset in a location that is not virtual, such as Paris, as well as a virtual representation of the location in a virtual reality system.

In some embodiments, the media guidance application determines a number of users of the plurality of users that consumed the media asset at the first geographic location by determining the number of users that consumed the media asset while accessing the virtual location within the virtual reality map. For example, the media guidance application may track the users that access a virtual location, such as Paris, and determine the number of users that consumed the media asset, such as "Ratatouille," based on the number of users that consumed the media asset while accessing the virtual location, such as Paris. In some embodiments, the number of users that consumed the media asset may include the number of users consuming the media asset while accessing the virtual location, such as virtual Paris, as well as the number of users consuming the media asset at the geographic location that is not the virtual location, such as Paris.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
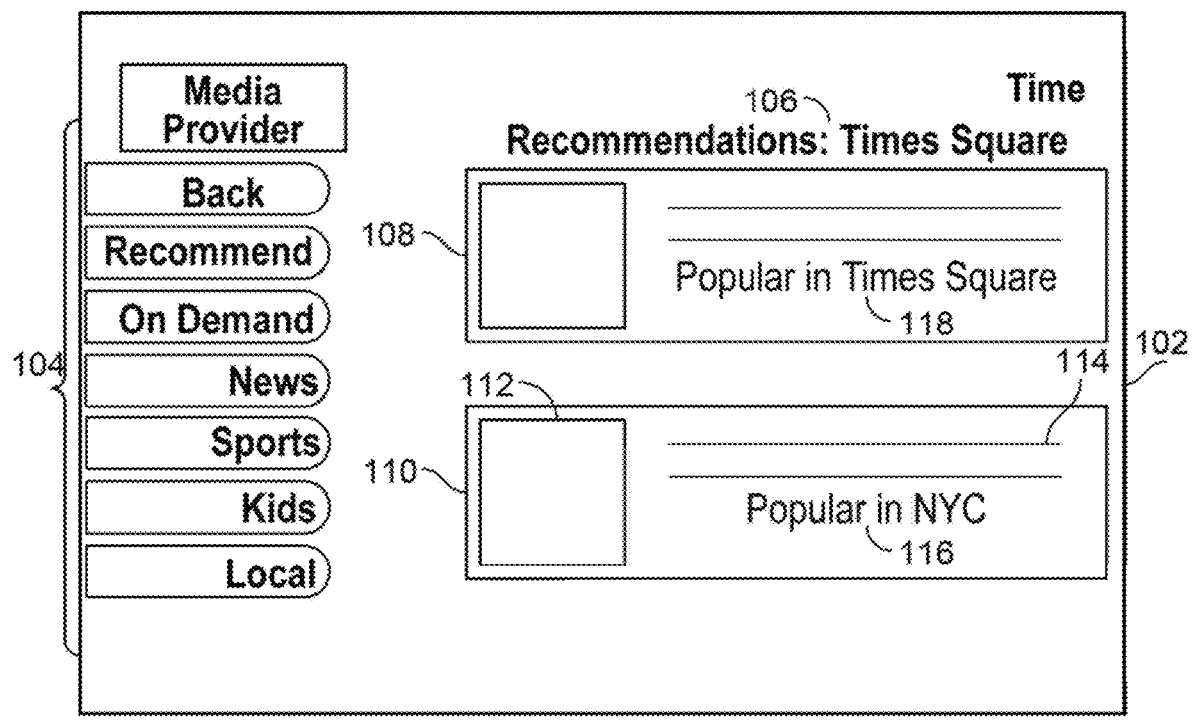
FIG. 1 shows an illustrative embodiment of a display screen that may be used to provide media guidance recommendations based on the geographic location of the user, in accordance with some embodiments of the disclosure.

Methods and systems are provided herein for recommending a media asset based on a geographic location at which that media asset was frequently consumed. For example, the system may monitor a location, such as New York City or Times Square, to determine popular media assets watched there, such as "The Avengers," and when another user visits New York City, the system may then notify the user that the movie, such as "The Avengers," is associated with New York City. The system stores the geographic locations associated with the media asset in the database based on the consumption of the media asset so that other users may be notified which media assets are associated with each geographic location.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

FIG. 1 shows an illustrative embodiment of a display screen that may be used to provide media guidance recommendations based on the geographic location of the user. Display 102 includes selectable options menu 104 as well as media recommendations 108 and 110, based on the user's location 106. Each of the media recommendations 108 and 110 includes information 114 about the respective media asset. Information 114 may include an image 112, such as a poster or picture related to the media asset, or additional textual information identifying the media asset. Information 114 may also include the locations 118 and 116 associated with media recommendations 108 and 110. In some embodiments, locations 116 and 118 may match the user's location 106. In other embodiments, locations 116 and 118 may be different locations within a threshold distance of user's location 106. For example, if the user is in Times Square, the user's location 106 may be Times Square, but New York City is also a possible location, and so locations 118 and 116 may be either Times Square or New York City as well as any other possible location based on the user's location 106.

In some embodiments, the media guidance application monitors consumption of a media asset by a plurality of users at the first geographic location, such as either location 116 or location 118. For example, the media guidance application may monitor the consumption of the media asset by tracking the viewing history of users within a set distance of a location 116. In another example, the media guidance application may monitor what media assets any user consumes across multiple locations, identify when a user selects to consume a specific media asset, such as "The Avengers," determine that the user is at location 116 and store, in association with location 116, an updated number of people that consumed the media asset, such as "The Avengers."

The media guidance application determines a number of users of the plurality of users that consumed the media asset at the first geographic location, such as location 116. In some embodiments, the media guidance application may determine a number of users by counting the number of users in a specified location, such as location 116, with a specific media asset, such as "The Avengers," on the respective user's viewing history. In other embodiments, the media guidance application may retrieve from memory an updated number of people that consumed the media asset, such as "The Avengers," where the updated number of people was stored in association with a location, such as location 116.

In some embodiments, the media guidance application determines the number of users of the plurality of users that consumed the media asset at the first geographic location, such as location 116, by detecting that a user is consuming the media asset at the selected geographic location, such as location 116, and incrementing the number of users that consumed the media asset at the selected geographic location, such as location 116, in the database by one. For example, the media guidance application may detect that a user is currently consuming a media asset, such as "The Avengers," at a location, such as location 116, and increment by one the number of users that consumed the media asset, such as "The Avengers," at the selected geographic location, such as location 116, as it is stored in the database.

In some embodiments, the media guidance application determines the number of users of the plurality of users that consumed the media asset at the first geographic location, such as location 116, by determining the number of users that consumed the media asset within a threshold distance from the first geographic location, such as location 116. For example, the media guidance application may determine that anyone within three city blocks of the intersection of $45^{th}$ Street and Broadway is in Times Square (i.e., location 118). In other embodiments, the media guidance application may have predetermined regions associated with a location. For example, the media guidance application may draw a region including multiple city blocks and anyone within the determined boundaries is at Times Square (i.e., location 118). The location of the user may be determined based on the location of a user device, such as the user equipment with the display 102, or any other user equipment.

The media guidance application determines whether the number of users that consumed the media asset at the first geographic location, such as location 116, exceeds a threshold. In some embodiments, the media guidance application may set the threshold based on the number of users that consumed other media assets at the same location, such as location 116. In other embodiments, the media guidance application may set the threshold based on the number of users that have watched the same media asset, such as "The Avengers," in another location, such as location 116. In yet other embodiments, the media guidance application may receive from the user a selected setting indicating the threshold. In some embodiments, the threshold may be based on population of the first geographic location (i.e., location 116). For example, if "The Avengers" is watched an equivalent number of times in New York City and Omaha, the number of users watching "The Avengers" would be a greater proportion of the population of Omaha than of the population of New York City, and so a threshold may be set based on the size of the proportion of the population of location 116 which consumes the media asset.

The media guidance application stores the first geographic location and the corresponding number of users in an entry corresponding to the media asset in the database. The database may include for any media asset a set of geographic locations and corresponding numbers of users associated with the media asset. For example, the media guidance application may include the locations 116 and 118, in a set of geographic locations associated with the media asset, such as "The Avengers," stored in the database along with the corresponding number of users for each location.

The media guidance application retrieves, from the entry corresponding to the media asset in the database, a set of stored geographic locations associated with the media asset and the corresponding number of users for each geographic location. In some embodiments, the media guidance application may retrieve from the database the set of geographic locations, such as locations 116 and 118, and the corresponding number of users that consumed the media asset, such as "The Avengers," in each location of the set.

The media guidance application selects, from the set of stored geographic locations associated with the media asset, a geographic location with a highest number of users (i.e., location 116). In some embodiments, the media guidance application selects from the set of stored geographic locations associated with the media asset, the geographic location with the highest corresponding number of users, by ranking the set of geographic locations based on the corresponding number of users of each geographic location. For example, the media guidance application may select the geographic location of the set with the highest number of users, such as location 116. In some embodiments, the media guidance application ranks the set of stored geographic locations by weighting each geographic location in the set of stored geographic locations using the location metadata (or any portion of information 114) for the show itself. For example, if "The Avengers"—which takes place in New York City—is consumed by roughly the same number of people in New York City as in Dallas, Boston, and San Francisco, the media guidance application would give a higher overall weighting to New York City as a relevant location for consumption. In some embodiments, the media guidance application ranks the set of stored geographic locations by determining for each location of the set of stored geographic locations the proportion of the population of the location that consumes the media asset and weighting each location accordingly.

The media guidance application designates the selected geographic location as a geographic location at which the media asset was frequently consumed. For example, the media guidance application designates the location, such as location 116, as a geographic location at which the media asset, such as "The Avengers," was frequently consumed. In cases where there is a ranking of the multiple locations, the media guidance application may designate multiple geographic locations based on the ranking. For example, the media guidance application may select, from the ranking, the top two most geographic locations at which the media asset was frequently consumed, such as locations 116 and 118, and designate both locations accordingly.

The media guidance application detects a user at the user's location 106. The media guidance application may track the user's location 106 through the user's mobile device or other user equipment. In some embodiments, the media guidance application detects the user at the user's location 106 by detecting that the user is within a threshold distance from the user's location 106. For example, the media guidance application may determine that anyone within three city blocks of the intersection of 45$^{th}$ Street and Broadway is in Times Square. In other embodiments, the media guidance application may have predetermined regions associated with a location. For example, the media guidance application may draw a region including multiple city blocks and anyone within the determined boundaries is at Times Square. The location of the user may be determined based on the location of a user device, such as the user equipment with the display 102, or any other user equipment.

The media guidance application recommends the media asset, via media recommendations 108 and 110, to the user based on detecting the user at the user's location 106. The media guidance application determines media recommendations 108 and 110 based on comparing user's location 106 to locations 116 and 118. The media guidance application searches the database to find media recommendations 108 and 110 by searching for locations 116 and 118 that correspond to the user's location 106. Locations 116 and 118 may match the user's location exactly or may be a related location. For example, New York City is a location related to Times Square, and the Eiffel Tower is related to Paris. The media guidance application may relate locations based on locations within regions, such as Times Square within New York City, or locations with similar purposes, such as relating a first beach to a second beach. The media guidance application may notify the user of the recommended media asset and identify the locations associated with the recommendation, such as locations 116 and 118. The notification may include additional information such as broadcast schedules, actor information, or source, such as information 114. The media guidance application may distribute the media asset to the user equipment and start playback, record the media asset, or perform any associated media guidance operations.

Figure 2:
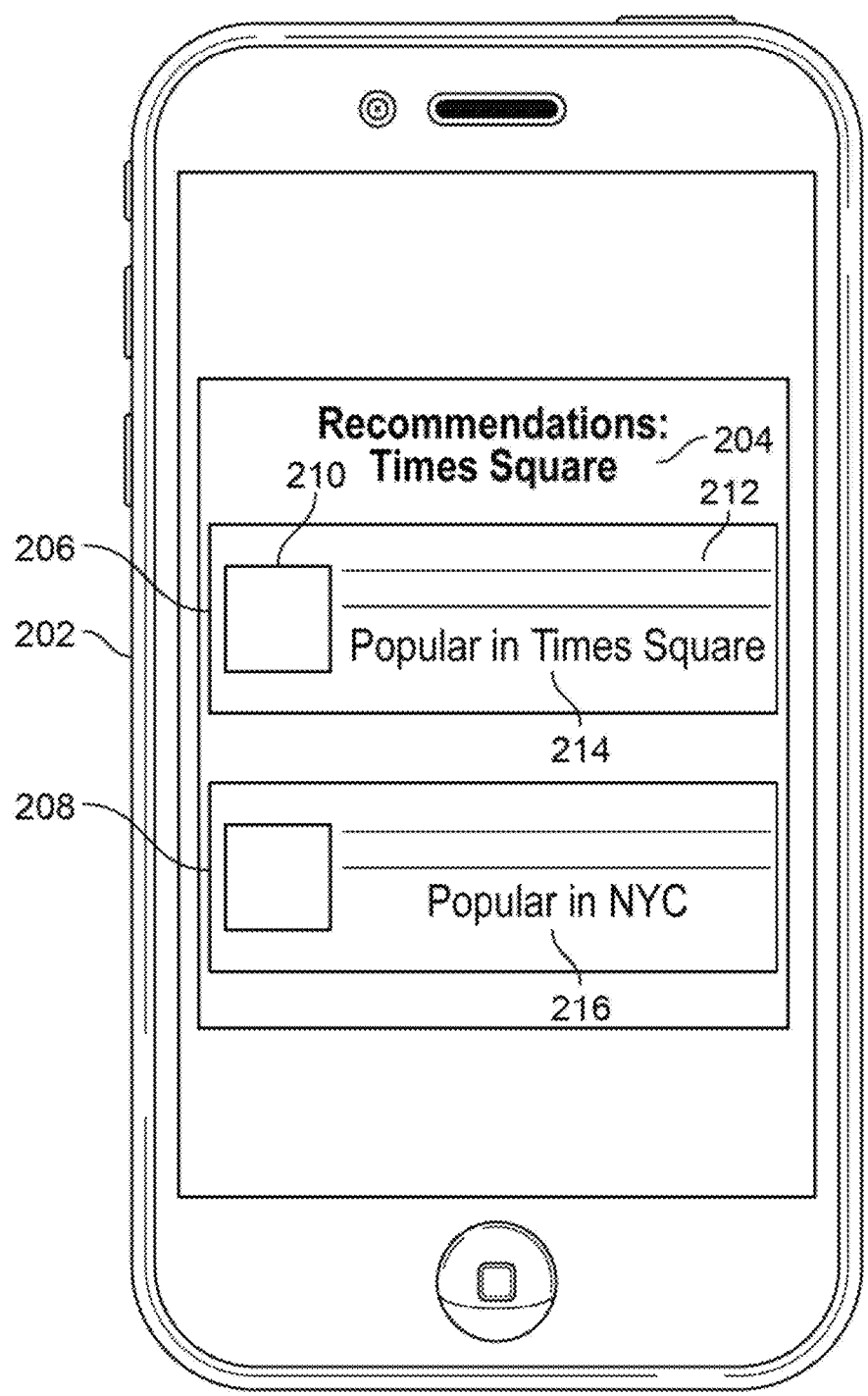
FIG. 2 shows another illustrative embodiment of a display screen that may be used to provide media guidance recommendations based on the geographic location of the user, in accordance with some embodiments of the disclosure.

FIG. 2 shows another illustrative embodiment of a display screen that may be used to provide media guidance recommendations based on the geographic location of the user. Display 202 includes media recommendations 206 and 208, based on the user's location 204. Each of the media recommendations 206 and 208 includes information 212 about the respective media asset. Information 212 may include an image 210, such as a poster or picture related to the media asset, or additional textual information identifying the media asset. Information 212 may also include the locations 214 and 216 associated with media recommendations 206 and 208. In some embodiments, locations 214 and 216 may match the user's location 204. In other embodiments, locations 214 and 216 may be different locations within a threshold distance of user's location 204. For example, if the user is in Times Square, the user's location 204 may be Times Square, but New York City is also a possible location, and so locations 214 and 216 may be either Times Square or New York City as well as any other possible location based on the user's location 204. User's location 204 may be determined based on the location of the user device with display 202.

In some embodiments, the media guidance application monitors consumption of a media asset by a plurality of users at the first geographic location, such as either location 214 or location 216. For example, the media guidance application may monitor the consumption of the media asset by tracking the viewing history of users within a set distance of a location 214. In another example, the media guidance application may monitor what media assets any user across multiple locations, identify when a user selects to consume a specific media asset, such as "The Avengers," determine that the user is at location 214 and store, in association with location 116, an updated number of people that consumed the media asset, such as "The Avengers."

The media guidance application determines a number of users of the plurality of users that consumed the media asset at the first geographic location, such as location 214. In some embodiments, the media guidance application may determine a number of users by counting the number of users in a specified location, such as location 214, with a specific media asset, such as "The Avengers," on the respective user's viewing history. In other embodiments, the media guidance application may retrieve from memory an updated number of people that consumed the media asset, such as "The Avengers," where the updated number of people was stored in association with a location, such as location 214.

In some embodiments, the media guidance application determines the number of users of the plurality of users that consumed the media asset at the first geographic location, such as location 214, by detecting that a user is consuming the media asset at the selected geographic location, such as location 214, and incrementing the number of users that consumed the media asset at the selected geographic location, such as location 214, in the database by one. For example, the media guidance application may detect that a user is currently consuming a media asset, such as "The Avengers," at a location, such as location 116, and increment by one the number of users that consumed the media asset, such as "The Avengers," at the selected geographic location, such as location 214, as it is stored in the database.

In some embodiments, the media guidance application determines the number of users of the plurality of users that consumed the media asset at the first geographic location, such as location 214, by determining the number of users that consumed the media asset within a threshold distance from the first geographic location, such as location 214. For example, the media guidance application may determine that anyone within three city blocks of the intersection of $45^{th}$ Street and Broadway is in Times Square (i.e., location 214). In other embodiments, the media guidance application may have predetermined regions associated with a location. For example, the media guidance application may draw a region including multiple city blocks and anyone within the determined boundaries is at Times Square (i.e., location 214). The location of the user may be determined based on the location of a user device, such as the user equipment with the display 202, or any other user equipment.

The media guidance application determines whether the number of users that consumed the media asset at the first geographic location, such as location 214, exceeds a threshold. In some embodiments, the media guidance application may set the threshold based on the number of users that consumed other media assets at the same location, such as location 214. In other embodiments, the media guidance application may set the threshold based on the number of users that have watched the same media asset, such as "The Avengers," in another location, such as location 214. In yet other embodiments, the media guidance application may receive from the user a selected setting indicating the threshold. In some embodiments, the threshold may be based on population of the first geographic location (i.e., location 214). For example, if "The Avengers" is watched an equivalent number of times in New York City and Omaha, the number of users watching "The Avengers" would be a greater proportion of the population of Omaha than of the population of New York City, and so a threshold may be set based on the size of the proportion of the population of a location (i.e., location 214) which consumes the media asset.

The media guidance application stores the first geographic location and the corresponding number of users in an entry corresponding to the media asset in the database. The database may include for any media asset a set of geographic locations and corresponding numbers of users associated with the media asset. For example, the media guidance application may include the locations 214 and 216, in a set of geographic locations associated with the media asset, such as "The Avengers," stored in the database along with the corresponding number of users for each location.

The media guidance application retrieves, from the entry corresponding to the media asset in the database, a set of stored geographic locations associated with the media asset and the corresponding number of users for each geographic location. In some embodiments, the media guidance application may retrieve from the database the set of geographic locations, such as locations 214 and 216, and the corresponding number of users that consumed the media asset, such as "The Avengers," in each location of the set.

The media guidance application selects, from the entry corresponding to the media asset in the database, a set of stored geographic locations associated with the media asset and the corresponding number of users for each geographic location. In some embodiments, the media guidance application selects from the set of stored geographic locations associated with the media asset, the geographic location with the highest corresponding number of users, by ranking the set of geographic locations based on the corresponding number of users of each geographic location. For example, the media guidance application may select the geographic location of the set with the highest number of users, such as location 214. In some embodiments, the media guidance application ranks the set of stored geographic locations by weighting each geographic location in the set of stored geographic locations using the location metadata (or any portion of information 212) for the show itself. For example, if "The Avengers"—which takes place in New York City—is consumed by roughly the same number of people in New York City as in Dallas, Boston, and San Francisco, the media guidance application would give a higher overall weighting to New York City as a relevant location for consumption. In some embodiments, the media guidance application ranks the set of stored geographic locations by determining for each location of the set of stored geographic locations the proportion of the population of the location that consumes the media asset and weighting each location accordingly.

The media guidance application designates the selected geographic location as a geographic location at which the media asset was frequently consumed. For example, the media guidance application designates the location, such as location 214, as a geographic location at which the media asset, such as "The Avengers," was frequently consumed. In cases where there is a ranking of the multiple locations, the media guidance application may designate multiple geographic locations based on the ranking. For example, the media guidance application may select, from the ranking, the top two most geographic locations at which the media asset was frequently consumed, such as locations 214 and 216, and designate both locations accordingly.

The media guidance application detects a user at the user's location 204. The media guidance application may track the user's location 204 through the user's mobile device or other user equipment. In some embodiments, the media guidance application detects the user at the user's location 204 by detecting that the user is within a threshold distance from the user's location 204. For example, the media guidance application may determine that anyone within three city blocks of the intersection of $45^{th}$ Street and Broadway is in Times Square. In other embodiments, the media guidance application may have predetermined regions associated with a location. For example, the media guidance application may draw a region including multiple city blocks and anyone within the determined boundaries is at Times Square. The location of the user may be determined based on the location of a user device, such as the user equipment with the display 202, or any other user equipment.

The media guidance application recommends the media asset, via media recommendations 206 and 208, to the user based on detecting the user at the user's location 204. The media guidance application determines media recommendations 206 and 208 based on comparing user's location 204 to locations 214 and 216. The media guidance application searches the database to find media recommendations 206 and 208 by searching for locations 206 and 208 that correspond to the user's location 204. Locations 206 and 208 may match the user's location exactly or may be a related location. For example, New York City is a location related to Times Square, and the Eiffel Tower is related to Paris. The media guidance application may relate locations based on locations within regions, such as Times Square within New York City, or locations with similar purposes, such as relating a first beach to a second beach. The media guidance application may notify the user of the recommended media asset and identify the locations associated with the recommendation, such as locations 214 and 216. The notification may include additional information such as broadcast schedules, actor information, or source, such as information 212. The media guidance application may distribute the media asset to the user equipment and start playback, record the media asset, or perform any associated media guidance operations.

Figure 3:
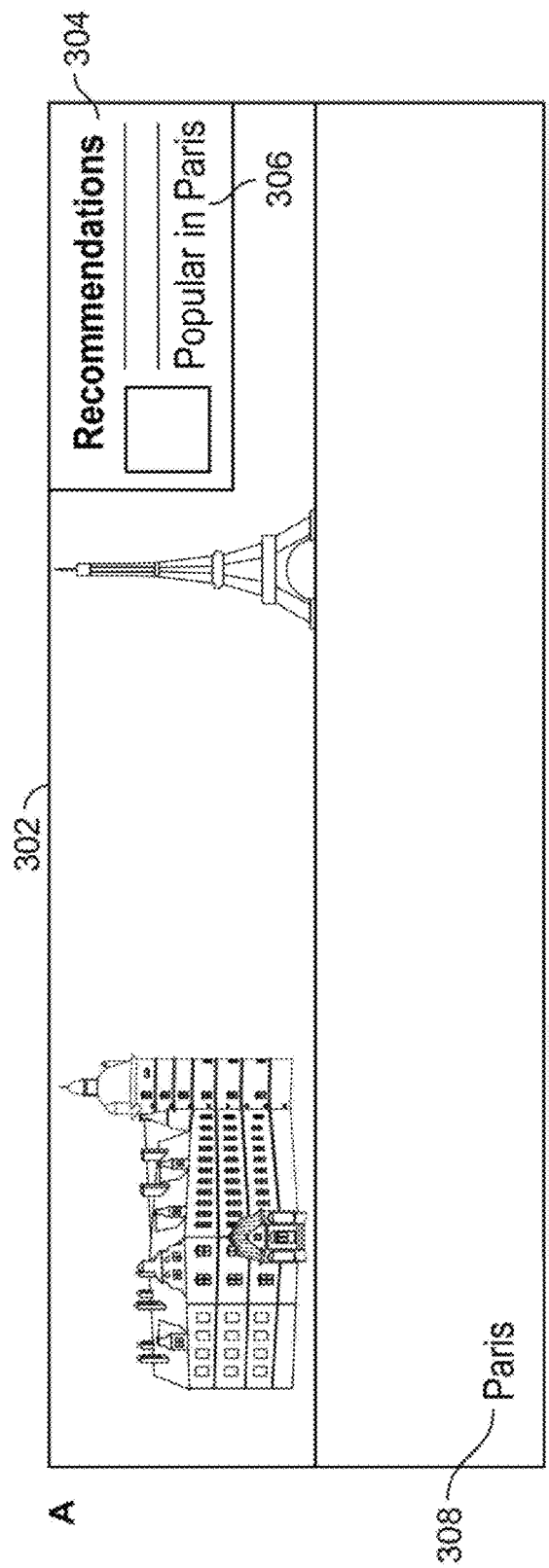
FIG. 3 shows an illustrative embodiment of a virtual reality system that may be used to provide media guidance recommendations based on the virtual location of the user, in accordance with some embodiments of the disclosure.
Figure 3:
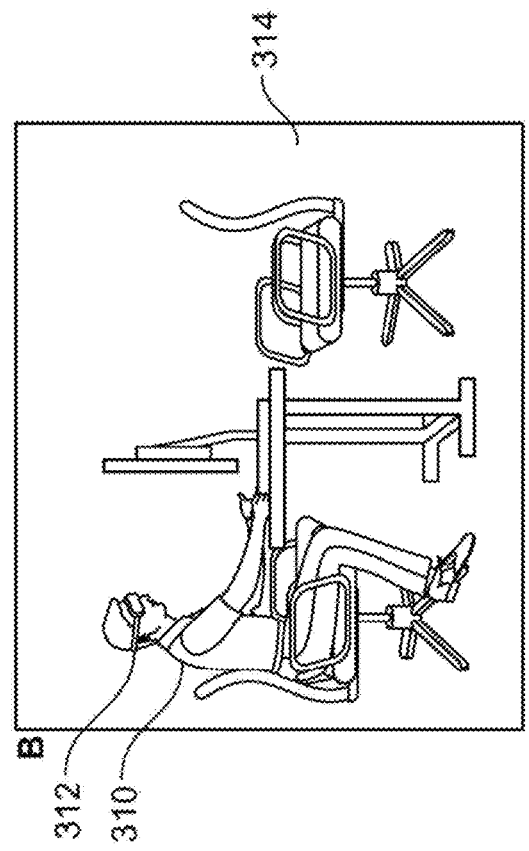

FIG. 3 shows an illustrative embodiment of a virtual reality system that may be used to provide media guidance recommendations based on the virtual location of the user. User 310 accesses virtual reality display 302 through the virtual reality system 312. Through the virtual reality display 302, user 310 explores virtual location 308 and receives media recommendation 304 based on location 306. Location 306 may match virtual location 308 or may be a related location, such as Paris and the Eiffel Tower. Location 306 may also be based on the environment 314 around user 310 outside of the virtual reality system 312.

In some embodiments, the selected geographic location is the first geographic location, and the first geographic location is a virtual location within a virtual reality map. For example, the media guidance application may provide the user 310 with access to a virtual reality map resembling a location such as Paris, through virtual reality system 312. In some embodiments, the virtual reality map comprises a plurality of artificial locations. For example, the media guidance application may provide the user 310 with access to an artificial location, such as Westeros, through the virtual reality system 312. If the user 310 is accessing virtual location 308, such as Paris or Westeros, the media guidance application may determine the location of the user 310 to be Paris or Westeros based on the virtual location 308. In some embodiments, the media guidance application detects a user at the first geographic location by detecting that the user 310 is accessing the virtual location 308 using the virtual reality system 312. For example, the media guidance application may detect the virtual location 308, such as Paris, currently accessed by the user 310.

The media guidance application may monitor consumption of the media asset by a plurality of users at a first geographic location, such as location 308. In some embodiments, the media guidance application monitors consumption of the media asset by the plurality of users at a first geographic location by monitoring the consumption of the media asset by a first plurality of users at the virtual location 308 in the virtual reality system 312 and monitoring the consumption of the media asset by a second plurality of users at a second geographic location associated with virtual location 308 in the virtual reality system 312, where the second geographic location is not a virtual location, such as Paris. For example, the media guidance application may monitor the users accessing the media asset in a location that is not virtual, such as Paris, as well as a virtual representation of the location in virtual reality system 312. The media guidance application may track the users that access virtual location 308 through virtual reality system 312 and track the number of users that access a media asset, such as "Ratatouille," while accessing the virtual location 308.

In some embodiments, the media guidance application determines a number of users of the plurality of users that consumed the media asset at the first geographic location by determining the number of users that consumed the media asset while accessing the virtual location 308 within the virtual reality map. For example, the media guidance application may track the users that access a virtual location 308 and determine the number of users that consumed the media asset, such as "Ratatouille," based on the number of users that consumed the media asset while accessing the virtual location 308. In some embodiments, the number of users that consumed the media asset may include the number of users consuming the media asset while accessing the virtual location 308, as well as the number of users consuming the media asset at the geographic location that is not the virtual location, such as Paris.

In some embodiments, the media guidance application determines the number of users of the plurality of users that consumed the media asset at the first geographic location by detecting that a user is consuming the media asset at the virtual location 308 and incrementing the number of users that consumed the media asset at the virtual location 308 in the database by one. For example, the media guidance application may detect that a user 310 is currently consuming a media asset, such as "Ratatouille," at the virtual location 308, and increment by one the number of users that consumed the media asset, such as "Ratatouille," at the virtual location 308, as it is stored in the database. In some embodiments, if virtual location 308 resembles a location that is not artificial, such as Paris, the number of users in the database may be associated with the location that is not artificial that the virtual location 308 represents. In other embodiments, the number of users stored in the database may be specifically stored for the number of users tracked at the virtual location 308.

The media guidance application determines whether the number of users that consumed the media asset at the virtual location 308 exceeds a threshold. In some embodiments, the media guidance application may set the threshold based on the number of users that consumed other media assets while accessing the same virtual location 308. In other embodiments, the media guidance application may set the threshold based on the number of users that have watched the same media asset, such as "Ratatouille," in another virtual location. In yet other embodiments, the media guidance application may receive from the user 310 a selected setting indicating the threshold. In some embodiments, the threshold may be based on population of the first geographic location (i.e., virtual location 308). For example, if "The Avengers" is watched an equivalent number of times in New York City and Omaha, the number of users watching "The Avengers" would be a greater proportion of the population of Omaha than of the population of New York City, and so a threshold may be set based on the size of the proportion of the population of a location (i.e., virtual location 308) which consumes the media asset.

The media guidance application stores the virtual location 308 and the corresponding number of users in an entry corresponding to the media asset in the database. In some embodiments, if virtual location 308 resembles a location that is not artificial, such as Paris, the number of users in the database may be associated with the location that is not artificial that the virtual location 308 represents. In other embodiments, the number of users stored in the database may be specifically stored for the number of users tracked at the virtual location 308. The database may include for any media asset a set of geographic locations and corresponding numbers of users associated with the media asset. The set of geographic locations may include both virtual locations as well as geographic locations that are not virtual.

The media guidance application retrieves, from the entry corresponding to the media asset in the database, a set of stored geographic locations associated with the media asset and the corresponding number of users for each geographic location. In some embodiments, the media guidance application may retrieve from the database the set of geographic locations, such as Paris, the Eiffel Tower, London, and New York City, and the corresponding number of users that consumed the media asset, such as "Ratatouille," in each location of the set.

The media guidance application selects, from the set of stored geographic locations associated with the media asset, a geographic location with a highest number of users. In some embodiments, the media guidance application selects from the set of stored geographic locations associated with the media asset, the geographic location with the highest corresponding number of users, by ranking the set of geographic locations based on the corresponding number of users of each geographic location. In some embodiments, the media guidance application ranks the set of stored geographic locations by weighting each geographic location in the set of stored geographic locations using the location metadata (or any portion of related metadata) for the show itself. For example, if "The Avengers"—which takes place in New York City—is consumed by roughly the same number of people in New York City as in Dallas, Boston, and San Francisco, the media guidance application would give a higher overall weighting to New York City as a relevant location for consumption. In some embodiments, the media guidance application ranks the set of stored geographic locations by determining for each location of the set of stored geographic locations the proportion of the population of the location that consumes the media asset and weighting each location accordingly.

The media guidance application designates the selected geographic location as a geographic location at which the media asset was frequently consumed. For example, the media guidance application designates the virtual location 308 as a geographic location at which the media asset, such as "Ratatouille," was frequently consumed. The media guidance application detects a user 310 at the virtual location 308. The media guidance application may track the virtual location of the user 310 through the virtual reality system 312.

The media guidance application recommends the media asset, via media recommendation 304, to the user based on detecting the user at the user's location 308. The media guidance application determines media recommendation 304 based on comparing the virtual location 308 to location 306. The media guidance application searches the database to find media recommendation 304 by searching for a location 306 that corresponds to the virtual location 308. Location 306 may match the user's location exactly or may be a related location. For example, New York City is a location related to Times Square, and the Eiffel Tower is related to Paris. The media guidance application may relate locations based on locations within regions, such as Times Square within New York City, locations with similar purposes, such as relating a first beach to a second beach or virtual and non-virtual locations, such as virtual Paris and the city of Paris. The media guidance application may notify the user 310 of the recommended media asset and identify the locations associated with the recommendation, such as location 306. The notification may include additional information such as broadcast schedules, actor information, or source. The media guidance application may distribute the media asset to the user equipment and start playback, record the media asset, or perform any associated media guidance operations.

Figure 4:
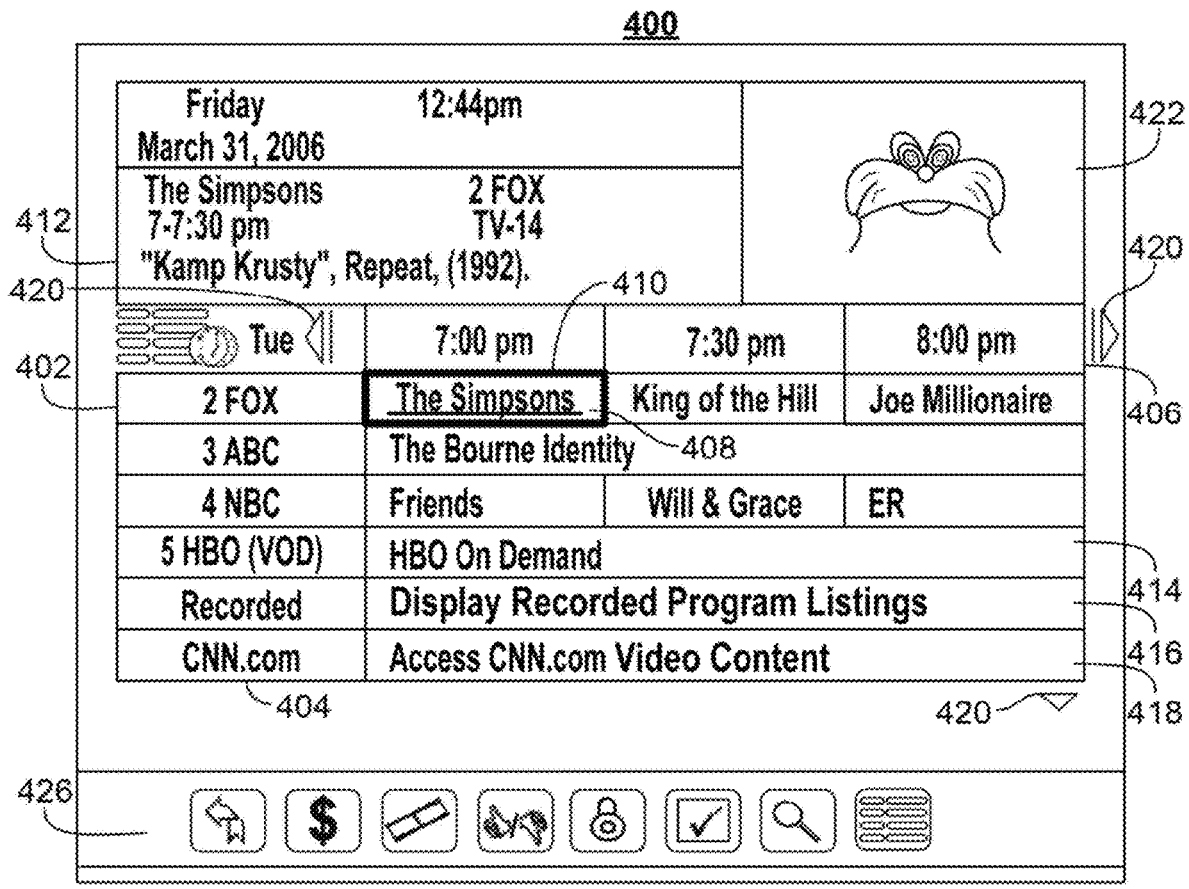
FIG. 4 shows an illustrative embodiment of a display screen that may be used to provide media guidance application listings and other media guidance information, in accordance with some embodiments of the disclosure.
Figure 5:
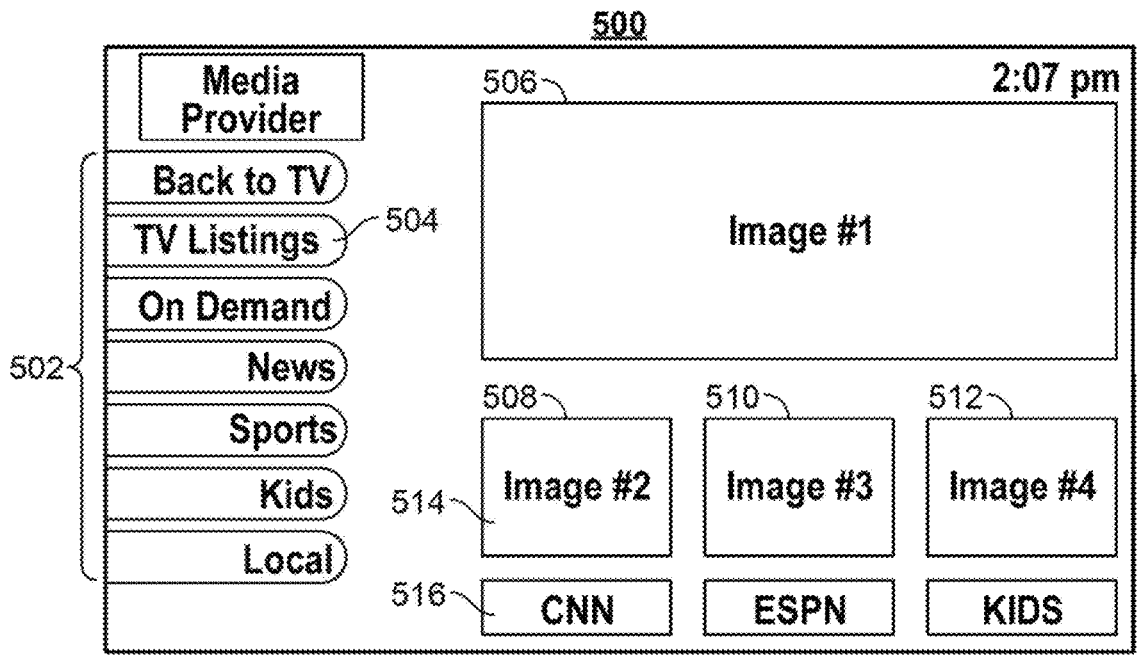
FIG. 5 shows another illustrative embodiment of a display screen that may be used to provide media guidance application listings, in accordance with some embodiments of the disclosure.

FIGS. 4-5 show illustrative display screens that may be used to provide media guidance data. The display screens shown in FIGS. 4-5 may be implemented on any suitable user equipment device or platform. While the displays of FIGS. 4-5 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 4 shows illustrative grid of a program listings display 400 arranged by time and channel that also enables access to different types of content in a single display. Display 400 may include grid 402 with: (1) a column of channel/content type identifiers 404, where each channel/content type identifier (which is a cell in the column) identifies a different channel or content type available; and (2) a row of time identifiers 406, where each time identifier (which is a cell in the row) identifies a time block of programming. Grid 402 also includes cells of program listings, such as program listing 408, where each listing provides the title of the program provided on the listing's associated channel and time. With a user input device, a user can select program listings by moving highlight region 410. Information relating to the program listing selected by highlight region 410 may be provided in program information region 412. Region 412 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 402 may provide media guidance data for non-linear programming including on-demand listing 414, recorded content listing 416, and Internet content listing 418. A display combining media guidance data for content from different types of content sources is sometimes referred to as a "mixed-media" display. Various permutations of the types of media guidance data that may be displayed that are different than display 400 may be based on user selection or guidance application definition (e.g., a display of only recorded and broadcast listings, only on-demand and broadcast listings, etc.). As illustrated, listings 414, 416, and 418 are shown as spanning the entire time block displayed in grid 402 to indicate that selection of these listings may provide access to a display dedicated to on-demand listings, recorded listings, or Internet listings, respectively. In some embodiments, listings for these content types may be included directly in grid 402. Additional media guidance data may be displayed in response to the user selecting one of the navigational icons 420. (Pressing an arrow key on a user input device may affect the display in a similar manner as selecting navigational icons 420.)

Display 400 may also include video region 422, and options region 426. Video region 422 may allow the user to view and/or preview programs that are currently available, will be available, or were available to the user. The content of video region 422 may correspond to, or be independent from, one of the listings displayed in grid 402. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 426 may allow the user to access different types of content, media guidance application displays, and/ or media guidance application features. Options region 426 may be part of display 400 (and other display screens described herein), or may be invoked by a user by selecting an on-screen option or pressing a dedicated or assignable button on a user input device. The selectable options within options region 426 may concern features related to program listings in grid 402 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 7. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 5. Video mosaic display 500 includes selectable options 502 for content information organized based on content type, genre, and/or other organization criteria. In display 500, television listings option 504 is selected, thus providing listings 506, 508, 510, and 512 as broadcast program listings. In display 500 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 508 may include more than one portion, including media portion 514 and text portion 516. Media portion 514 and/or text portion 516 may be selectable to view content in full-screen or to view information related to the content displayed in media portion 514 (e.g., to view listings for the channel that the video is displayed on).

The listings in display 500 are of different sizes (i.e., listing 506 is larger than listings 508, 510, and 512), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 6:
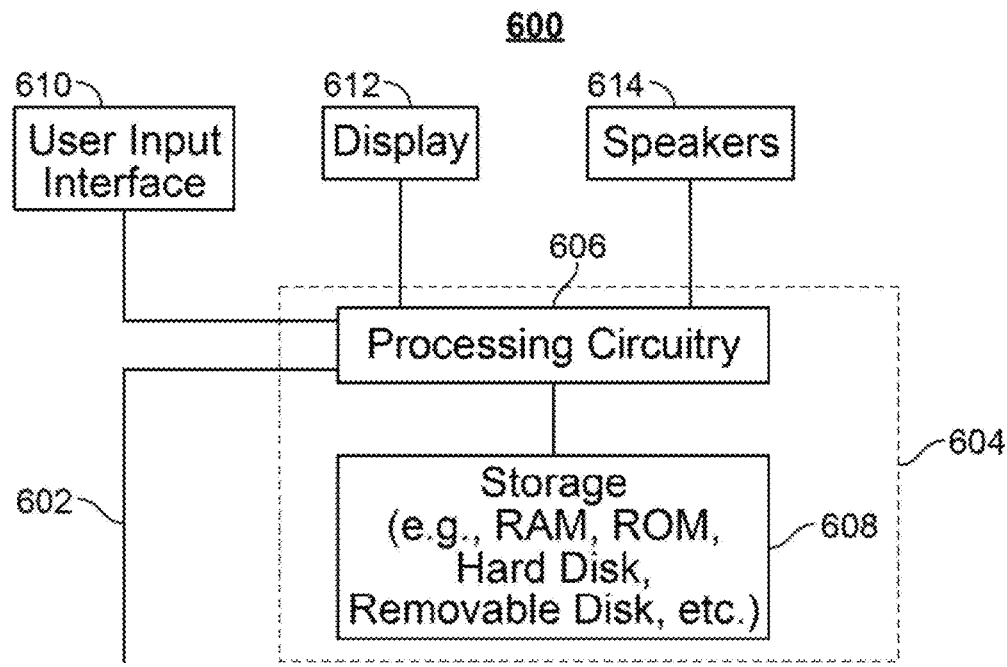
FIG. 6 is a block diagram of an illustrative user equipment (UE) device in accordance with some embodiments of the disclosure.

Users may access content and the media guidance application (and its display screens described above and below) from one or more of their user equipment devices. FIG. 6 shows a generalized embodiment of illustrative user equipment device 600. More specific implementations of user equipment devices are discussed below in connection with FIG. 7. User equipment device 600 may receive content and data via input/output (hereinafter "I/O") path 602. I/O path 602 may provide content (e.g., broadcast programming, on-demand programming, Internet content, content available over a local area network (LAN) or wide area network (WAN), and/or other content) and data to control circuitry 604, which includes processing circuitry 606 and storage 608. Control circuitry 604 may be used to send and receive commands, requests, and other suitable data using I/O path 602. I/O path 602 may connect control circuitry 604 (and specifically processing circuitry 606) to one or more communications paths (described below). I/O functions may be provided by one or more of these communications paths, but are shown as a single path in FIG. 6 to avoid overcomplicating the drawing.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for a media guidance application stored in memory (i.e., storage 608). Specifically, control circuitry 604 may be instructed by the media guidance application to perform the functions discussed above and below. For example, the media guidance application may provide instructions to control circuitry 604 to generate the media guidance displays. In some implementations, any action performed by control circuitry 604 may be based on instructions received from the media guidance application.

In client-server based embodiments, control circuitry 604 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 7). In addition, communications circuitry may include circuitry that enables peer-to-peer communication of user equipment devices, or communication of user equipment devices in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 608 may be used to store various types of content described herein as well as media guidance data described above. Nonvolatile memory may also be used (e.g., to launch a boot-up routine and other instructions). Cloud-based storage, described in relation to FIG. 7, may be used to supplement storage 608 or instead of storage 608.

Control circuitry 604 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 604 may also include scaler circuitry for upconverting and downconverting content into the preferred output format of the user equipment 600. Circuitry 604 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from user equipment 600, the tuning and encoding circuitry (including multiple tuners) may be associated with storage 608.

A user may send instructions to control circuitry 604 using user input interface 610. User input interface 610 may be any suitable user interface, such as a remote control, mouse, trackball, keypad, keyboard, touch screen, touchpad, stylus input, joystick, voice recognition interface, or other user input interfaces. Display 612 may be provided as a stand-alone device or integrated with other elements of user equipment device 600. For example, display 612 may be a touchscreen or touch-sensitive display. In such circumstances, user input interface 610 may be integrated with or combined with display 612. Display 612 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 612 may be HDTV-capable. In some embodiments, display 612 may be a 3D display, and the interactive media guidance application and any suitable content may be displayed in 3D. A video card or graphics card may generate the output to the display 612. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 604. The video card may be integrated with the control circuitry 604. Speakers 614 may be provided as integrated with other elements of user equipment device 600 or may be stand-alone units. The audio component of videos and other content displayed on display 612 may be played through speakers 614. In some embodiments, the audio may be distributed to a receiver (not shown), which processes and outputs the audio via speakers 614.

The guidance application may be implemented using any suitable architecture. For example, it may be a stand-alone application wholly-implemented on user equipment device 600. In such an approach, instructions of the application are stored locally (e.g., in storage 608), and data for use by the application is downloaded on a periodic basis (e.g., from an out-of-band feed, from an Internet resource, or using another suitable approach). Control circuitry 604 may retrieve instructions of the application from storage 608 and process the instructions to generate any of the displays discussed herein. Based on the processed instructions, control circuitry 604 may determine what action to perform when input is received from input interface 610. For example, movement of a cursor on a display up/down may be indicated by the processed instructions when input interface 610 indicates that an up/down button was selected.

In some embodiments, the media guidance application is a client-server based application. Data for use by a thick or thin client implemented on user equipment device 600 is retrieved on-demand by issuing requests to a server remote to the user equipment device 600. In one example of a client-server based guidance application, control circuitry 604 runs a web browser that interprets web pages provided by a remote server. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on equipment device 600. This way, the processing of the instructions is performed remotely by the server while the resulting displays are provided locally on equipment device 600. Equipment device 600 may receive inputs from the user via input interface 610 and transmit those inputs to the remote server for processing and generating the corresponding displays. For example, equipment device 600 may transmit a communication to the remote server indicating that an up/down button was selected via input interface 610. The remote server may process instructions in accordance with that input and generate a display of the application corresponding to the input (e.g., a display that moves a cursor up/down). The generated display is then transmitted to equipment device 600 for presentation to the user.

In some embodiments, the media guidance application is downloaded and interpreted or otherwise run by an interpreter or virtual machine (run by control circuitry 604). In some embodiments, the guidance application may be encoded in the ETV Binary Interchange Format (EBIF), received by control circuitry 604 as part of a suitable feed, and interpreted by a user agent running on control circuitry 604. For example, the guidance application may be an EBIF application. In some embodiments, the guidance application may be defined by a series of JAVA-based files that are received and run by a local virtual machine or other suitable middleware executed by control circuitry 604. In some of such embodiments (e.g., those employing MPEG-2 or other digital media encoding schemes), the guidance application may be, for example, encoded and transmitted in an MPEG-2 object carousel with the MPEG audio and video packets of a program.

Figure 7:
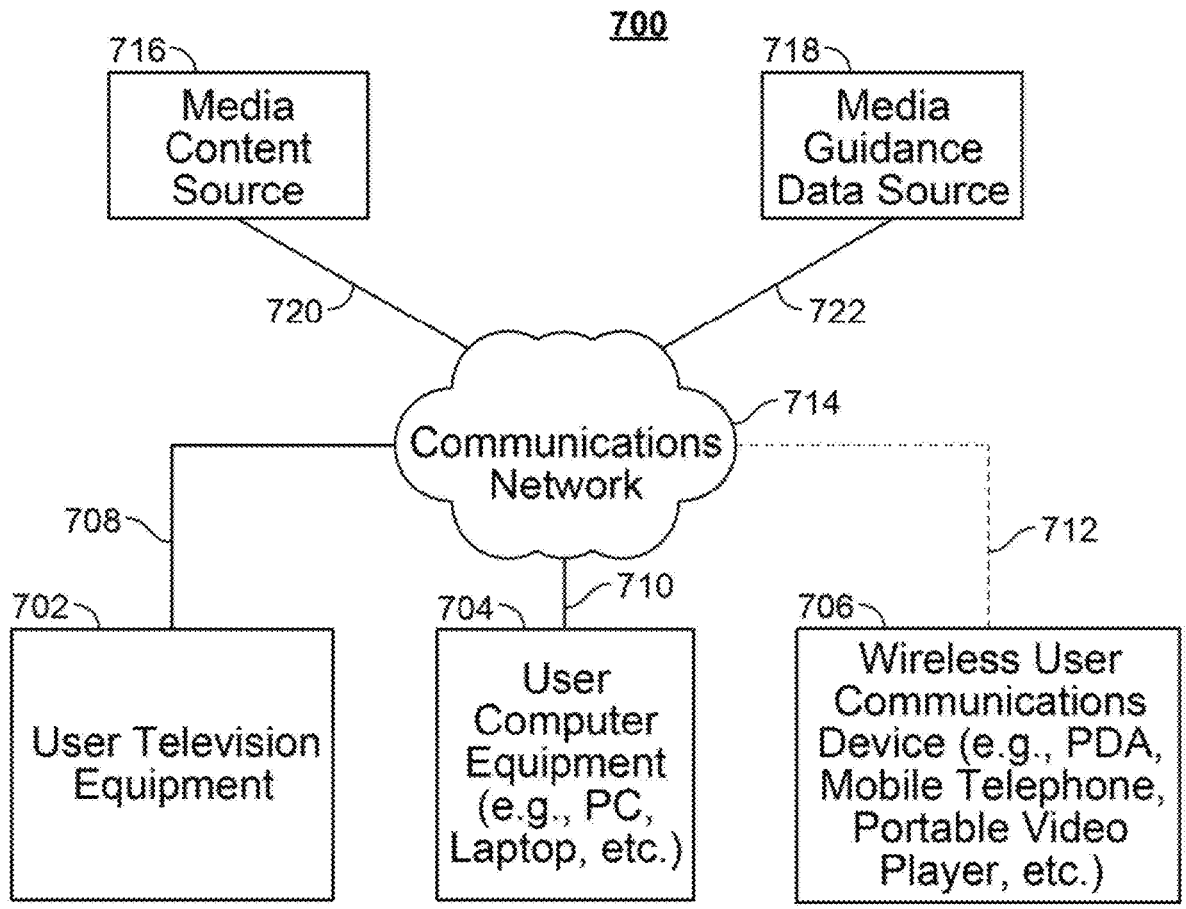
FIG. 7 is a block diagram of an illustrative media system in accordance with some embodiments of the disclosure.

User equipment device 600 of FIG. 6 can be implemented in system 700 of FIG. 7 as user television equipment 702, user computer equipment 704, wireless user communications device 706, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 6 may not be classified solely as user television equipment 702, user computer equipment 704, or a wireless user communications device 706. For example, user television equipment 702 may, like some user computer equipment 704, be Internet-enabled allowing for access to Internet content, while user computer equipment 704 may, like some television equipment 702, include a tuner allowing for access to television programming. The media guidance application may have the same layout on various different types of user equipment or may be tailored to the display capabilities of the user equipment. For example, on user computer equipment 704, the guidance application may be provided as a web site accessed by a web browser. In another example, the guidance application may be scaled down for wireless user communications devices 706.

In system 700, there is typically more than one of each type of user equipment device but only one of each is shown in FIG. 7 to avoid overcomplicating the drawing. In addition, each user may utilize more than one type of user equipment device and also more than one of each type of user equipment device.

In some embodiments, a user equipment device (e.g., user television equipment 702, user computer equipment 704, wireless user communications device 706) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 714. Namely, user television equipment 702, user computer equipment 704, and wireless user communications device 706 are coupled to communications network 714 via communications paths 708, 710, and 712, respectively. Communications network 714 may be one or more networks including the Internet, a mobile phone network, mobile voice or data network (e.g., a 4G or LTE network), cable network, public switched telephone network, or other types of communications network or combinations of communications networks. Paths 708, 710, and 712 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 712 is drawn with dotted lines to indicate that in the exemplary embodiment shown in FIG. 7 it is a wireless path and paths 708 and 710 are drawn as solid lines to indicate they are wired paths (although these paths may be wireless paths, if desired). Communications with the user equipment devices may be provided by one or more of these communications paths, but are shown as a single path in FIG. 7 to avoid overcomplicating the drawing.

Although communications paths are not drawn between user equipment devices, these devices may communicate directly with each other via communication paths, such as those described above in connection with paths 708, 710, and 712, as well as other short-range point-to-point communication paths, such as USB cables, IEEE 1394 cables, wireless paths (e.g., Bluetooth, infrared, IEEE 802-11, etc.), or other short-range communication via wired or wireless paths. BLUETOOTH is a certification mark owned by Bluetooth SIG, INC. The user equipment devices may also communicate with each other directly through an indirect path via communications network 714.

System 700 includes content source 716 and media guidance data source 718 coupled to communications network 714 via communication paths 720 and 722, respectively. Paths 720 and 722 may include any of the communication paths described above in connection with paths 708, 710, and 712. Communications with the content source 716 and media guidance data source 718 may be exchanged over one or more communications paths, but are shown as a single path in FIG. 7 to avoid overcomplicating the drawing. In addition, there may be more than one of each of content source 716 and media guidance data source 718, but only one of each is shown in FIG. 7 to avoid overcomplicating the drawing. (The different types of each of these sources are discussed below.) If desired, content source 716 and media guidance data source 718 may be integrated as one source device. Although communications between sources 716 and 718 with user equipment devices 702, 704, and 706 are shown as through communications network 714, in some embodiments, sources 716 and 718 may communicate directly with user equipment devices 702, 704, and 706 via communication paths (not shown) such as those described above in connection with paths 708, 710, and 712.

Content source 716 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 716 may be the originator of content (e.g., a television broadcaster, a Webcast provider, etc.) or may not be the originator of content (e.g., an on-demand content provider, an Internet provider of content of broadcast programs for downloading, etc.). Content source 716 may include cable sources, satellite providers, on-demand providers, Internet providers, over-the-top content providers, or other providers of content. Content source 716 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 718 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 718 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 718 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 718 may provide user equipment devices 702, 704, and 706 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 608, and executed by control circuitry 604 of a user equipment device 600. In some embodiments, media guidance applications may be client-server applications where only a client application resides on the user equipment device, and server application resides on a remote server. For example, media guidance applications may be implemented partially as a client application on control circuitry 604 of user equipment device 600 and partially on a remote server as a server application (e.g., media guidance data source 718) running on control circuitry of the remote server. When executed by control circuitry of the remote server (such as media guidance data source 718), the media guidance application may instruct the control circuitry to generate the guidance application displays and transmit the generated displays to the user equipment devices. The server application may instruct the control circuitry of the media guidance data source 718 to transmit data for storage on the user equipment. The client application may instruct control circuitry of the receiving user equipment to generate the guidance application displays.

Content and/or media guidance data delivered to user equipment devices 702, 704, and 706 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 700 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 7.

In one approach, user equipment devices may communicate with each other within a home network. User equipment devices can communicate with each other directly via short-range point-to-point communication schemes described above, via indirect paths through a hub or other similar device provided on a home network, or via communications network 714. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 716 to access content. Specifically, within a home, users of user television equipment 702 and user computer equipment 704 may access the media guidance application to navigate among and locate desirable content. Users may also access the media guidance application outside of the home using wireless user communications devices 706 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 714. These cloud resources may include one or more content sources 716 and one or more media guidance data sources 718. In addition or in the alternative, the remote computing sites may include other user equipment devices, such as user television equipment 702, user computer equipment 704, and wireless user communications device 706. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 704 or wireless user communications device 706 having content capture feature. Alternatively, the user can first transfer the content to a user equipment device, such as user computer equipment 704. The user equipment device storing the content uploads the content to the cloud using a data transmission service on communications network 714. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 6.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 8:
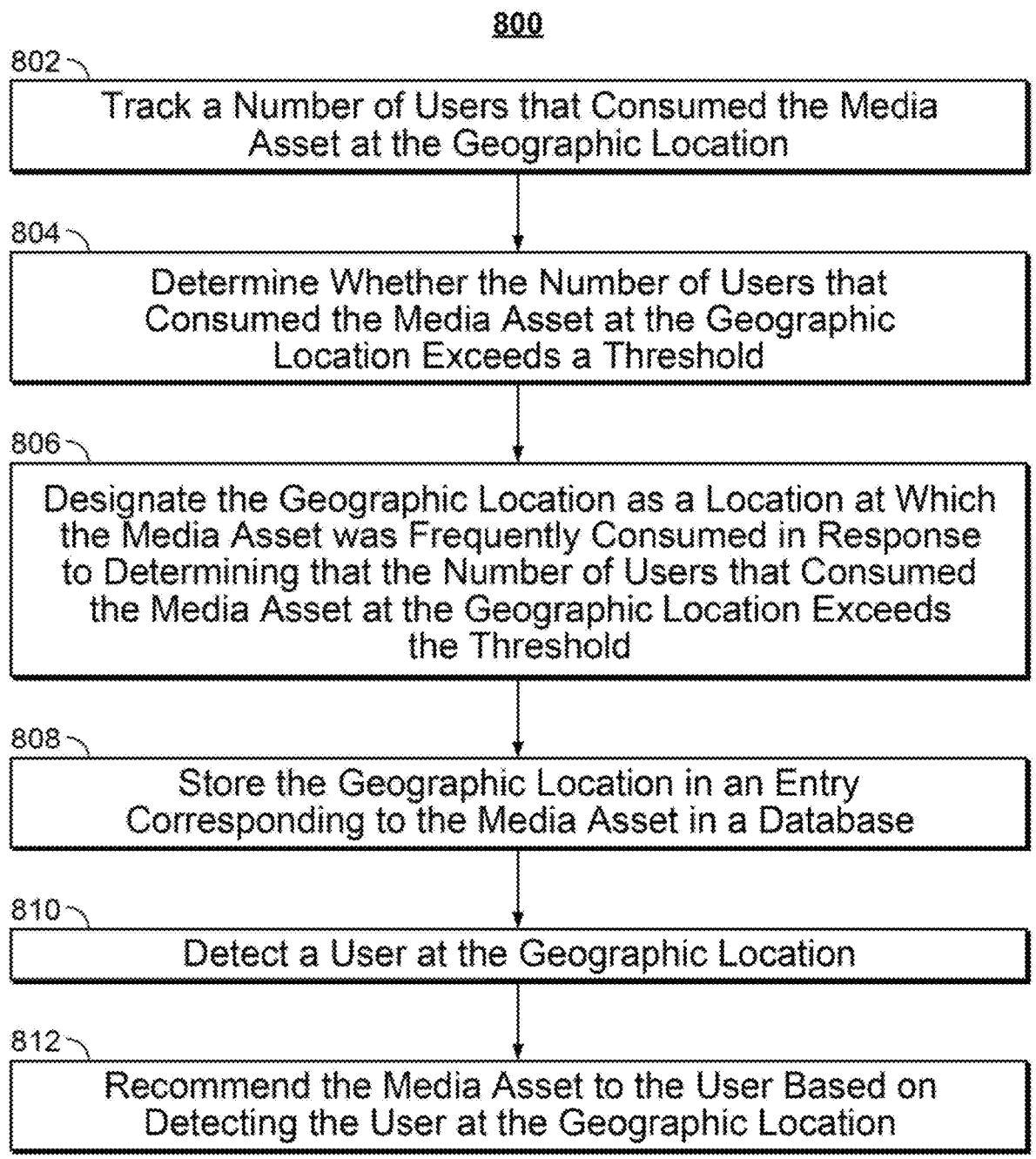
FIG. 8 is a flowchart of illustrative steps involved in recommending a media asset based on a geographic location at which that media asset was frequently consumed, in accordance with some embodiments of the disclosure.

FIG. 8 is a flowchart of illustrative steps involved in recommending a media asset based on a geographic location at which that media asset was frequently consumed.

At 802, the media guidance application tracks a number of users that consumed the media asset at the geographic location. For example, the media guidance application may track the viewing history of users within a set distance of a geographic location, such as all users within three blocks of Times Square. In another example, the media guidance application may monitor what media assets any user at any location consumes, identify when a user selects to consume a specific media asset, such as "The Avengers," identify the location of the user from which the selection was received, such as in New York City, and store, in association with the location, such as New York City or Times Square, an updated number of people that consumed the media asset, such as "The Avengers."

At 804, the media guidance application determines whether the number of users that consumed the media asset at the geographic location exceeds a threshold. In some embodiments, the media guidance application may set the threshold based on the number of users that consumed other media assets at the same location, such as New York City or Times Square. In other embodiments, the media guidance application may set the threshold based on the number of users that have watched the same media asset, such as "The Avengers," in another location, such as New York City or Times Square. In yet other embodiments, the media guidance application may receive from the user a selected setting indicating the threshold.

At 806, the media guidance application designates the geographic location as a location at which the media asset was frequently consumed in response to determining that the number of users that consumed the media asset at the geographic location exceeds the threshold. For example, the media guidance application designates the location, such as New York City or Times Square, as a geographic location at which the media asset, such as "The Avengers," was frequently consumed.

At 808, the media guidance application stores the geographic location in an entry corresponding to the media asset in a database. The database may include for any media asset a set of geographic locations and corresponding numbers of users associated with the media asset. For example, the media guidance application may include the location, such as New York City or Times Square, in a set of geographic locations associated with the media asset, such as "The Avengers," stored in the database along with the corresponding number of users for each location.

At 810, the media guidance application detects a user at the geographic location. The media guidance application may track the location of a user through the user's mobile device or other user equipment. In some embodiments, the media guidance application detects the user at the selected geographic location by detecting that the user is within a threshold distance from the selected geographic location. For example, the media guidance application may determine that anyone within three city blocks of the intersection of $45^{th}$ Street and Broadway is in Times Square. In other embodiments, the media guidance application may have predetermined regions associated with a location. For example, the media guidance application may draw a region including multiple city blocks and anyone within the determined boundaries is at Times Square.

At 812, the media guidance application recommends the media asset to the user based on detecting the user at the geographic location. The media guidance application may notify the user of the recommended media asset and identify the selected geographic location associated with the recommendation. The notification may include additional information such as broadcast schedules, actor information, or source. The media guidance application may distribute the media asset to the user equipment and start playback, record the media asset, or perform any associated media guidance operations.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 6-7 could be used to perform one or more of the steps in FIG. 8.

Figure 9:
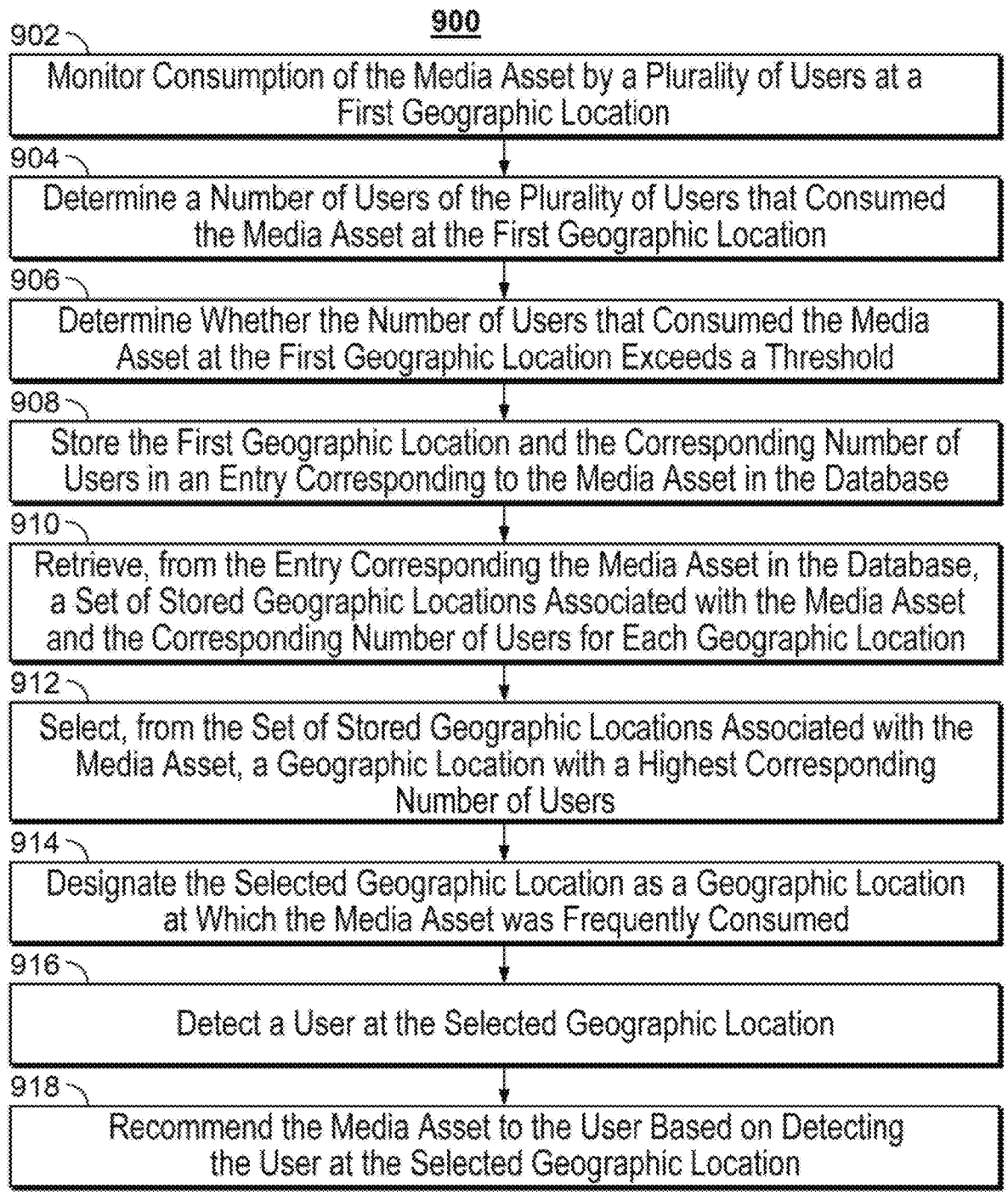
FIG. 9 is another flowchart of illustrative steps involved in recommending a media asset based on a geographic location at which that media asset was frequently consumed, in accordance with some embodiments of the disclosure.

FIG. 9 is another flowchart of illustrative steps involved in recommending a media asset based on a geographic location at which that media asset was frequently consumed.

At 902, the media guidance application monitors consumption of the media asset by a plurality of users at a first geographic location. For example, the media guidance application may monitor the consumption of the media asset by tracking the viewing history of users within a set distance of a geographic location, such as all users within three blocks of Times Square. In another example, the media guidance application may monitor what media assets any user at any location consumes, identify when a user selects to consume a specific media asset, such as "The Avengers," identify the location of the user from which the selection was received, such as in New York City, and store, in association with the location, such as New York City or Times Square, an updated number of people that consumed the media asset, such as "The Avengers."

At 904, the media guidance application determines a number of users of the plurality of users that consumed the media asset at the first geographic location. In some embodiments, the media guidance application may determine a number of users by counting the number of users in a specified location, such as New York City or Times Square, with a specific media asset, such as "The Avengers," from the respective user's viewing history. In other embodiments, the media guidance application may retrieve from memory an updated number of people that consumed the media asset, such as "The Avengers," where the updated number of people was stored in association with a location, such as New York City or Times Square.

In some embodiments, the media guidance application determines the number of users of the plurality of users that consumed the media asset at the first geographic location by detecting that a user is consuming the media asset at the selected geographic location and incrementing the number of users that consumed the media asset at the selected geographic location in the database by one. For example, the media guidance application may detect that a user is currently consuming a media asset, such as "The Avengers," at a location, such as New York City or Times Square, and increment by one the number of users that consumed the media asset, such as "The Avengers," at the selected geographic location, such as New York City or Times Square, as it is stored in the database.

In some embodiments, the media guidance application determines the number of users of the plurality of users that consumed the media asset at the first geographic location by determining the number of users that consumed the media asset within a threshold distance from the first geographic location. For example, the media guidance application may determine that anyone within three city blocks of the intersection of $45^{th}$ Street and Broadway is in Times Square. In other embodiments, the media guidance application may have predetermined regions associated with a location. For example, the media guidance application may draw a region including multiple city blocks and anyone within the determined boundaries is at Times Square.

At 906, the media guidance application determines whether the number of users that consumed the media asset at the first geographic location exceeds a threshold. In some embodiments, the media guidance application may set the threshold based on the number of users that consumed other media assets at the same location, such as New York City or Times Square. In other embodiments, the media guidance application may set the threshold based on the number of users that have watched the same media asset, such as "The Avengers," in another location, such as New York City or Times Square. In yet other embodiments, the media guidance application may receive from the user a selected setting indicating the threshold. In some embodiments, the threshold may be based on population of the first geographic location. For example, if "The Avengers" is watched an equivalent number of times in New York City and Omaha, the number of users watching "The Avengers" would be a greater proportion of the population of Omaha than of the population of New York City, and so a threshold may be set based on the size of the proportion of the population of a location which consumes the media asset.

At 908, the media guidance application stores the first geographic location and the corresponding number of users in an entry corresponding to the media asset in the database. The database may include for any media asset a set of geographic locations and corresponding numbers of users associated with the media asset. For example, the media guidance application may include the location, such as New York City or Times Square, in a set of geographic locations associated with the media asset, such as "The Avengers," stored in the database along with the corresponding number of users for each location.

At 910, the media guidance application retrieves, from the entry corresponding to the media asset in the database, a set of stored geographic locations associated with the media asset and the corresponding number of users for each geographic location. In some embodiments, the media guidance application may retrieve from the database the set of geographic locations, such as New York City or Times Square, Washington D.C, and Boston, and the corresponding number of users that consumed the media asset, such as "The Avengers," in each location of the set.

At 912, the media guidance application selects, from the set of stored geographic locations associated with the media asset, a geographic location with a highest number of users. In some embodiments, the media guidance application selects from the set of stored geographic locations associated with the media asset, the geographic location with the highest corresponding number of users, by ranking the set of geographic locations based on the corresponding number of users of each geographic location. For example, the media guidance application may select the geographic location of the set with the highest number of users, such as New York City or Times Square. In some embodiments, the media guidance application ranks the set of stored geographic locations by weighting each geographic location in the set of stored geographic locations using the location metadata (or any portion of related metadata) for the show itself. For example, if "The Avengers"—which takes place in New York City—is consumed by roughly the same number of people in New York City as in Dallas, Boston, and San Francisco, the media guidance application would give a higher overall weighting to New York City as a relevant location for consumption. In some embodiments, the media guidance application ranks the set of stored geographic locations by determining for each location of the set of stored geographic locations the proportion of the population of the location that consumes the media asset and weighting each location accordingly.

At 914, the media guidance application designates the selected geographic location as a geographic location at which the media asset was frequently consumed. For example, the media guidance application designates the location, such as New York City or Times Square, as a geographic location at which the media asset, such as "The Avengers," was frequently consumed.

At 916, the media guidance application detects a user at the selected geographic location. The media guidance application may track the location of a user through the user's mobile device or other user equipment. In some embodiments, the media guidance application detects the user at the selected geographic location by detecting that the user is within a threshold distance from the selected geographic location. For example, the media guidance application may determine that anyone within three city blocks of the intersection of $45^{th}$ Street and Broadway is in Times Square. In other embodiments, the media guidance application may have predetermined regions associated with a location. For example, the media guidance application may draw a region including multiple city blocks and anyone within the determined boundaries is at Times Square.

At 918, the media guidance application recommends the media asset to the user based on detecting the user at the selected geographic location. The media guidance application may search the database for locations that match the location of the user exactly or may be a related location. For example, New York City is a location related to Times Square, and the Eiffel Tower is related to Paris. The media guidance application may relate locations based on locations within regions, such as Times Square within New York City, locations with similar purposes, such as relating a first beach to a second beach or virtual and non-virtual locations, such as virtual Paris and the city of Paris. The media guidance application may notify the user of the recommended media asset and identify the selected geographic location associated with the recommendation. The notification may include additional information such as broadcast schedules, actor information, or source. The media guidance application may distribute the media asset to the user equipment and start playback, record the media asset, or perform any associated media guidance operations.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 6-7 could be used to perform one or more of the steps in FIG. 9.

Figure 10:
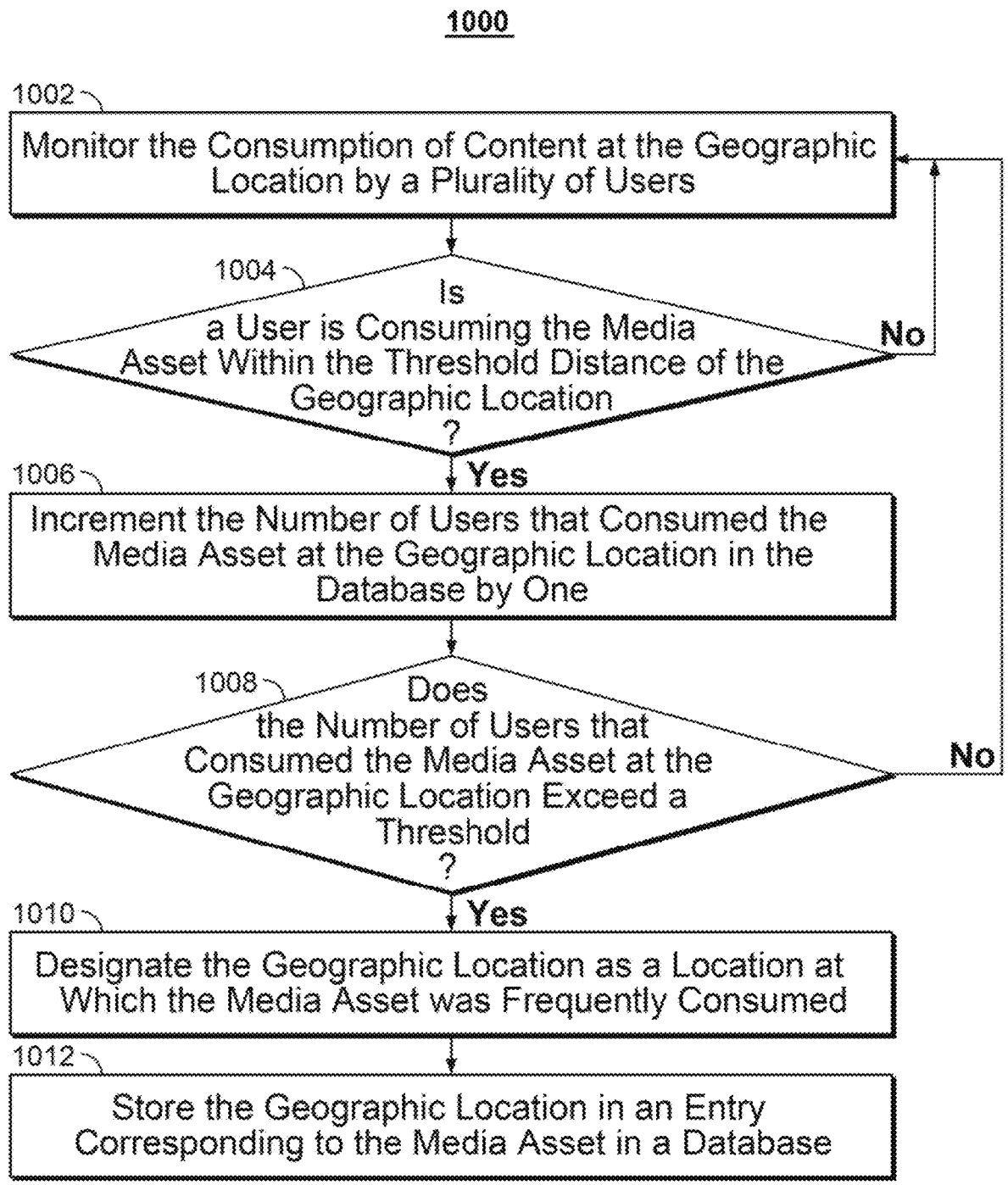
FIG. 10 is a flowchart of illustrative steps involved in determining the geographic location at which the media asset is frequently consumed, in accordance with some embodiments of the disclosure.

FIG. 10 is a flowchart of illustrative steps involved in determining the geographic location at which the media asset is frequently consumed.

At 1002, the media guidance application monitors the consumption of content at the geographic location by a plurality of users. For example, the media guidance application may monitor the consumption of the media asset by tracking the viewing history of users within a set distance of a geographic location, such as all users within three blocks of Times Square. In another example, the media guidance application may monitor what media assets any user at any location consumes, identify when a user selects to consume a specific media asset, such as "The Avengers," identify the location of the user from which the selection was received, such as in New York City.

At 1004, the media guidance application determines whether a user is consuming the media asset within the threshold distance of the geographic location. For example, the media guidance application may determine that anyone within three city blocks of the intersection of $45^{th}$ Street and Broadway is in Times Square. In other embodiments, the media guidance application may have predetermined regions associated with a location. For example, the media guidance application may draw a region including multiple city blocks and anyone within the determined boundaries is at Times Square. If the user is consuming the media asset within the threshold distance of the geographic location, process 1000 proceeds to 1006. Otherwise, process 1000 proceeds to 1002.

At 1006, the media guidance application increments the number of users that consumed the media asset at the geographic location in the database by one For example, the media guidance application may detect that a user is currently consuming a media asset, such as "The Avengers," at a location, such as New York City or Times Square, and increment by one the number of users that consumed the media asset, such as "The Avengers," at the selected geographic location, such as New York City or Times Square, as it is stored in the database. In some embodiments, if the user is within the threshold distance of multiple locations, such as New York City or Times Square, the media guidance application may increment by one the number of users that consumed the media asset for both locations.

At 1008, the media guidance application determines whether the number of users that consumed the media asset at the geographic location exceeds the threshold. In some embodiments, the media guidance application may set the threshold based on the number of users that consumed other media assets at the same location, such as New York City or Times Square. In other embodiments, the media guidance application may set the threshold based on the number of users that have watched the same media asset, such as "The Avengers," in another location, such as New York City or Times Square. In yet other embodiments, the media guidance application may receive from the user a selected setting indicating the threshold. In some embodiments, the threshold may be based on population of the first geographic location. For example, if "The Avengers" is watched an equivalent number of times in New York City and Omaha, the number of users watching "The Avengers" would be a greater proportion of the population of Omaha than of the population of New York City, and so a threshold may be set based on the size of the proportion of the population of a location which consumes the media asset. If the number of users exceeds the threshold, process 1000 proceeds to 1010. Otherwise, process 1000 proceeds to 1002.

At 1010, the media guidance application designates the geographic location as a location at which the media asset was frequently consumed. For example, the media guidance application designates the location, such as New York City or Times Square, as a geographic location at which the media asset, such as "The Avengers," was frequently consumed.

At 1012, the media guidance application stores the geographic location in an entry corresponding to the media asset in a database. The database may include for any media asset a set of geographic locations and corresponding numbers of users associated with the media asset. For example, the media guidance application may include the location, such as New York City or Times Square, in a set of geographic locations associated with the media asset, such as "The Avengers," stored in the database along with the corresponding number of users for each location.

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 6-7 could be used to perform one or more of the steps in FIG. 10.

Figure 11:
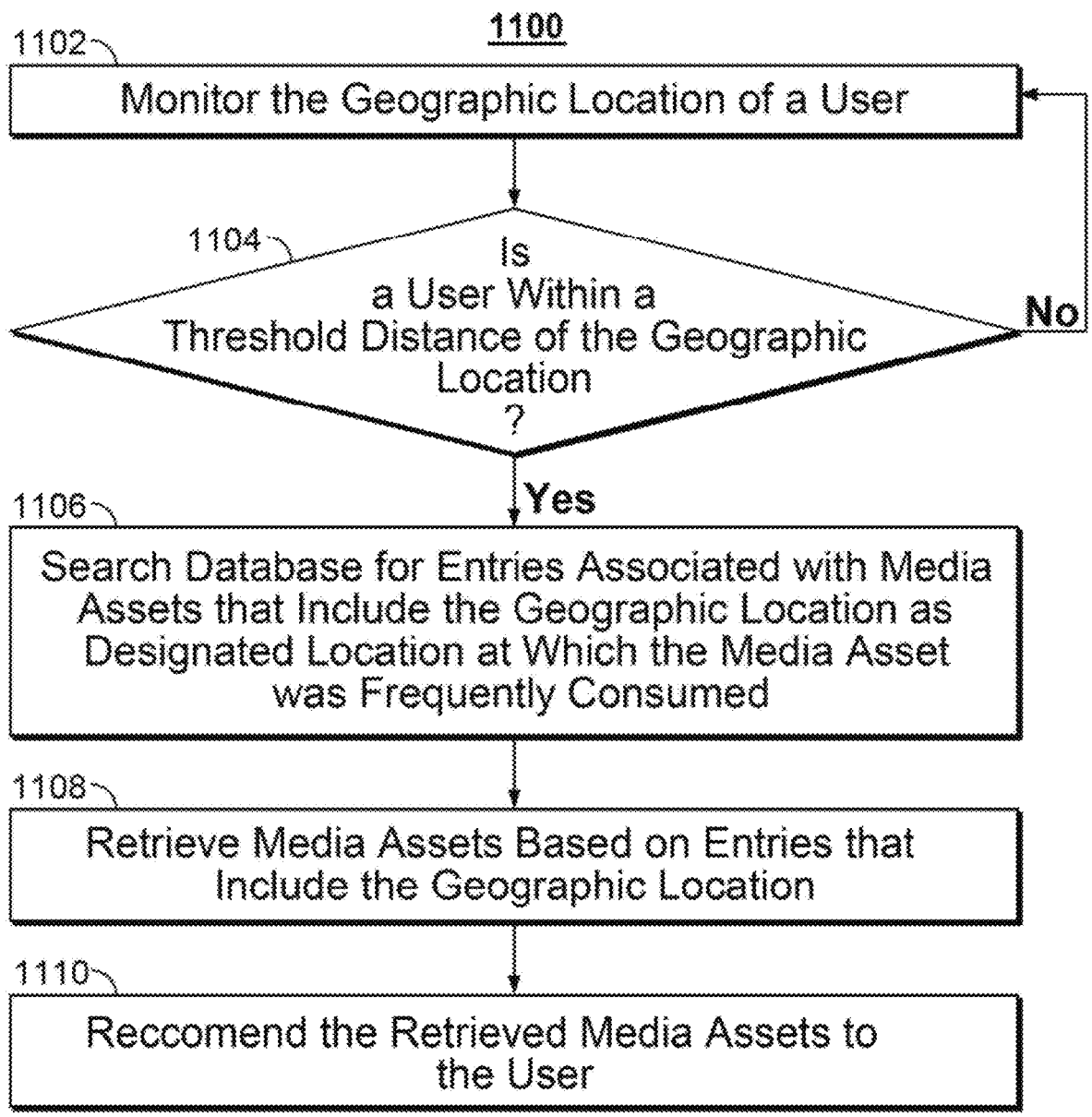
FIG. 11 is a flowchart of illustrative steps involved in determining the media asset to recommend to the user based on the geographic location of the user, in accordance with some embodiments of the disclosure.

FIG. 11 is a flowchart of illustrative steps involved in determining the media asset to recommend to the user based on the geographic location of the user.

At 1102, the media guidance application monitors the geographic location of a user. The media guidance application may track the location of a user through the user's mobile device or other user equipment.

At 1104, the media guidance application determines whether a user within a threshold distance of the geographic location. For example, the media guidance application may determine that anyone within three city blocks of the intersection of 45$^{th}$ Street and Broadway is in Times Square. In other embodiments, the media guidance application may have predetermined regions associated with a location. For example, the media guidance application may draw a region including multiple city blocks and anyone within the determined boundaries is at Times Square. If the user is within the threshold distance of the geographic location, process 1100 proceeds to 1106. Otherwise, process 1100 proceeds to 1102.

At 1106, the media guidance application searches the database for entries associated with media assets that include the geographic location as designated location at which the media asset was frequently consumed. For example, the media guidance application may search the database for the entries with locations that include the location of the user, such as New York City or Times Square. In some embodiments, if the user is within the threshold distance of multiple locations, such as New York City or Times Square, the media guidance application may search the database using both locations to find entries that include either location. The media guidance application may search the database for locations that match the location of the user exactly or may be a related location. For example, New York City is a location related to Times Square, and the Eiffel Tower is related to Paris. The media guidance application may relate locations based on locations within regions, such as Times Square within New York City, or locations with similar purposes, such as relating a first beach to a second beach.

At 1108, the media guidance application retrieves media assets based on entries that include the geographic location. For example, the media guidance application may retrieve the media assets associated with the searched entries, such as "The Avengers."

At 1110, the media guidance application recommends the retrieved media assets to the user. The media guidance application may notify the user of the recommended media asset and identify the selected geographic location associated with the recommendation. The notification may include additional information such as broadcast schedules, actor information, or source. The media guidance application may distribute the media asset to the user equipment and start playback, record the media asset, or perform any associated media guidance operations.

It is contemplated that the steps or descriptions of FIG. 11 may be used with any other embodiment of this disclosure. In addition, the steps and descriptions described in relation to FIG. 11 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 6-7 could be used to perform one or more of the steps in FIG. 11.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for recommending a media asset based on a geographic location at which the media asset was consumed, the method comprising:
    identifying a location of a user device;
    determining that the location is inside a first geographic area;
    identifying a second geographic area in which the first geographic area is located;
    identifying a first media asset consumed by a first threshold number of users in the first geographic area;
    identifying a second media asset consumed by a second threshold number of users in the second geographic area; and
    generating for simultaneous display, on the user device, a recommendation of the first media asset consumed by the first threshold number of users in the first geographic area and a recommendation of the second media asset consumed by the second threshold number of users in the second geographic area in which the first geographic area is located.

2. The method of claim 1, wherein generating for simultaneous display, on the user device, a recommendation of the first media asset consumed by the first threshold number of users in the first geographic area and a recommendation of the second media asset consumed by the second threshold number of users in the second geographic area in which the first geographic area is located further comprises:
    generating for display a user interface element;
    generating for display within the user interface element an identifier of the first media asset; and
    generating for display within the user interface element an identifier of the second media asset.

3. The method of claim 1, further comprising generating for simultaneous display a first indication of the first geographic area in association with the recommendation of the first media asset and a second indication of the second geographic area in association with the recommendation of the second media asset.

4. The method of claim 1, further comprising defining a third threshold based on a first number of users of a first plurality of users that consumed a candidate media asset in a third geographic area.

5. The method of claim 4, further comprising:
    monitoring consumption of media assets by a second plurality of users in the first geographic area; and
    determining whether a second number of users of the second plurality of users that consumed the candidate media asset in the first geographic area exceeds the third threshold;
    wherein identifying the first media asset consumed by a threshold number of users in the first geographic area occurs in response to determining that the second number of users of the second plurality of users that consumed the candidate media asset at the first geographic area exceeds the third threshold.

6. The method of claim 5, wherein monitoring consumption of media assets by a second plurality of users in the first geographic area comprises:
    detecting that a user is consuming a respective media asset in the first geographic area; and
    incrementing a counter representing a number of users that consumed the respective media asset in the first geographic area in a database by one.

7. The method of claim 4, further comprising:
    monitoring consumption of media assets by a second plurality of users in the second geographic area; and
    determining whether a second number of users of the second plurality of users that consumed the candidate media asset in the second geographic area exceeds the third threshold;
    wherein identifying the second media asset consumed by a threshold number of users in the second geographic area occurs in response to determining that the second number of users of the second plurality of users that consumed the candidate media asset at the second geographic area exceeds the third threshold.

8. The method of claim 7, wherein monitoring consumption of media assets by a second plurality of users in the second geographic area comprises:
    detecting that a user is consuming a respective media asset in the second geographic area; and
    incrementing a counter representing a number of users that consumed the respective media asset in the second geographic area in a database by one.

9. The method of claim 1, wherein determining that the location is associated with a first geographic area comprises determining that the location is within the first geographic area.

10. The method of claim 1, wherein determining that the location is associated with a first geographic area comprises determining that the location is within a threshold distance from the first geographic area.

11. A system for recommending a media asset based on a geographic location at which the media asset was consumed, the system comprising:
    memory; and
    control circuitry configured to:
    identify a location of a user device;
    determine that the location is inside a first geographic area;
    identify a second geographic area in which the first geographic area is located;
    identify, based on data stored in the memory, a first media asset consumed by a first threshold number of users in the first geographic area;
    identify, based on data stored in the memory, a second media asset consumed by a second threshold number of users in the second geographic area; and
    generating for simultaneous display, on the user device, a recommendation of the first media asset consumed by the first threshold number of user in the first geographic area and a recommendation of the second media asset consumed by the second threshold number of users in the second geographic area in which the first geographic area is located.

12. The system of claim 11, wherein the control circuitry configured to generate for simultaneous display, on the user device, a recommendation of the first media asset consumed by the first threshold number of users in the first geographic area and a recommendation of the second media asset consumed by the second threshold number of users in the second geographic area in which the first geographic area is located is further configured to:
- generate for display a user interface element;
- generate for display within the user interface element an identifier of the first media asset; and
- generate for display within the user interface element an identifier of the second media asset.

13. The system of claim 11, wherein the control circuitry is further configured to generate for simultaneous display a first indication of the first geographic area in association with the recommendation of the first media asset and a second indication of the second geographic area in association with the recommendation of the second media asset.

14. The system of claim 11, wherein the control circuitry is further configured to define a third threshold based on a first number of users of a first plurality of users that consumed a candidate media asset in a third geographic area.

15. The system of claim 14, wherein the control circuitry is further configured to:
- monitor consumption of media assets by a second plurality of users in the first geographic area; and
- determine whether a second number of users of the second plurality of users that consumed the candidate media asset in the first geographic area exceeds the third threshold;
- wherein the control circuitry configured to identify the first media asset consumed by a threshold number of users in the first geographic area is further configured to do so in response to determining that the second number of users of the second plurality of users that consumed the candidate media asset at the first geographic area exceeds the third threshold.

16. The system of claim 15, wherein the control circuitry configures to monitor consumption of media assets by a second plurality of users in the first geographic area is further configured to:
- detect that a user is consuming a respective media asset in the first geographic area; and
- increment a counter representing a number of users that consumed the respective media asset in the first geographic area in a database by one.

17. The system of claim 14, wherein the control circuitry is further configured to:
- monitor consumption of media assets by a second plurality of users in the second geographic area; and
- determine whether a second number of users of the second plurality of users that consumed the candidate media asset in the second geographic area exceeds the third threshold;
- wherein the control circuitry configured to identify the second media asset consumed by a threshold number of users in the second geographic area is further configured to do so in response to determining that the second number of users of the second plurality of users that consumed the candidate media asset at the second geographic area exceeds the third threshold.

18. The system of claim 17, wherein the control circuitry configured to monitor consumption of media assets by a second plurality of users in the second geographic area is further configured to:
- detect that a user is consuming a respective media asset in the second geographic area; and
- increment a counter representing a number of users that consumed the respective media asset in the second geographic area in a database by one.

19. The system of claim 11, wherein the control circuitry configured to determine that the location is associated with a first geographic area is further configured to determine that the location is within the first geographic area.

20. The system of claim 11, wherein the control circuitry configured to determine that the location is associated with a first geographic area is further configured to determine that the location is within a threshold distance from the first geographic area.

* * * * *